US011112906B2

(12) United States Patent
Yamada

(10) Patent No.: US 11,112,906 B2
(45) Date of Patent: Sep. 7, 2021

(54) INPUT DEVICE, METHOD OF CONTROLLING INPUT DEVICE, AND PROGRAM

(71) Applicant: Alps Alpine Co., Ltd., Tokyo (JP)

(72) Inventor: Tomoki Yamada, Miyagi-ken (JP)

(73) Assignee: Alps Alpine Co., Ltd., Tokyo (JP)

(*) Notice: Subject to any disclaimer, the term of this patent is extended or adjusted under 35 U.S.C. 154(b) by 0 days.

(21) Appl. No.: 17/014,531

(22) Filed: Sep. 8, 2020

(65) Prior Publication Data

US 2020/0401268 A1 Dec. 24, 2020

Related U.S. Application Data

(63) Continuation of application No. PCT/JP2019/005140, filed on Feb. 13, 2019.

(30) Foreign Application Priority Data

Mar. 12, 2018 (JP) .............................. JP2018-044504

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC .............................. G06F 3/0418; G06F 3/044
See application file for complete search history.

(56) References Cited

U.S. PATENT DOCUMENTS

| 2007/0242053 | A1 | 10/2007 | Muranaka |
| 2017/0168639 | A1 | 6/2017 | Imai et al. |
| 2017/0277301 | A1* | 9/2017 | Koresawa ............ H03K 17/962 |
| 2019/0102008 | A1* | 4/2019 | Takada .................. G06F 3/0416 |

FOREIGN PATENT DOCUMENTS

| JP | 2007-286814 | 11/2007 |
| JP | 2017-111507 | 6/2017 |

OTHER PUBLICATIONS

International Search Report from International Application No. PCT/JP2019/005140 dated May 7, 2019.

* cited by examiner

*Primary Examiner* — Michael Pervan
(74) *Attorney, Agent, or Firm* — Beyer Law Group LLP

(57) ABSTRACT

An input device has: a detecting unit that generates a detection signal that changes according to the degree of the proximity of an object; a deciding unit that decides, according to a series of detection signals, whether a change due to the proximity of the object has occurred in the detection signals; and a reference value updating unit that, if the deciding unit decides that a change due to the proximity of the object has not occurred in the detection signals, updates a reference value, according to the detection signals. The deciding unit changes a decision reference so that the higher the degree, indicated by the difference between the reference value and the value of the detection signal, of the proximity of the object, is, the more likely the deciding unit is to decide that a change due to the proximity of the object has occurred in the detection signals.

14 Claims, 18 Drawing Sheets

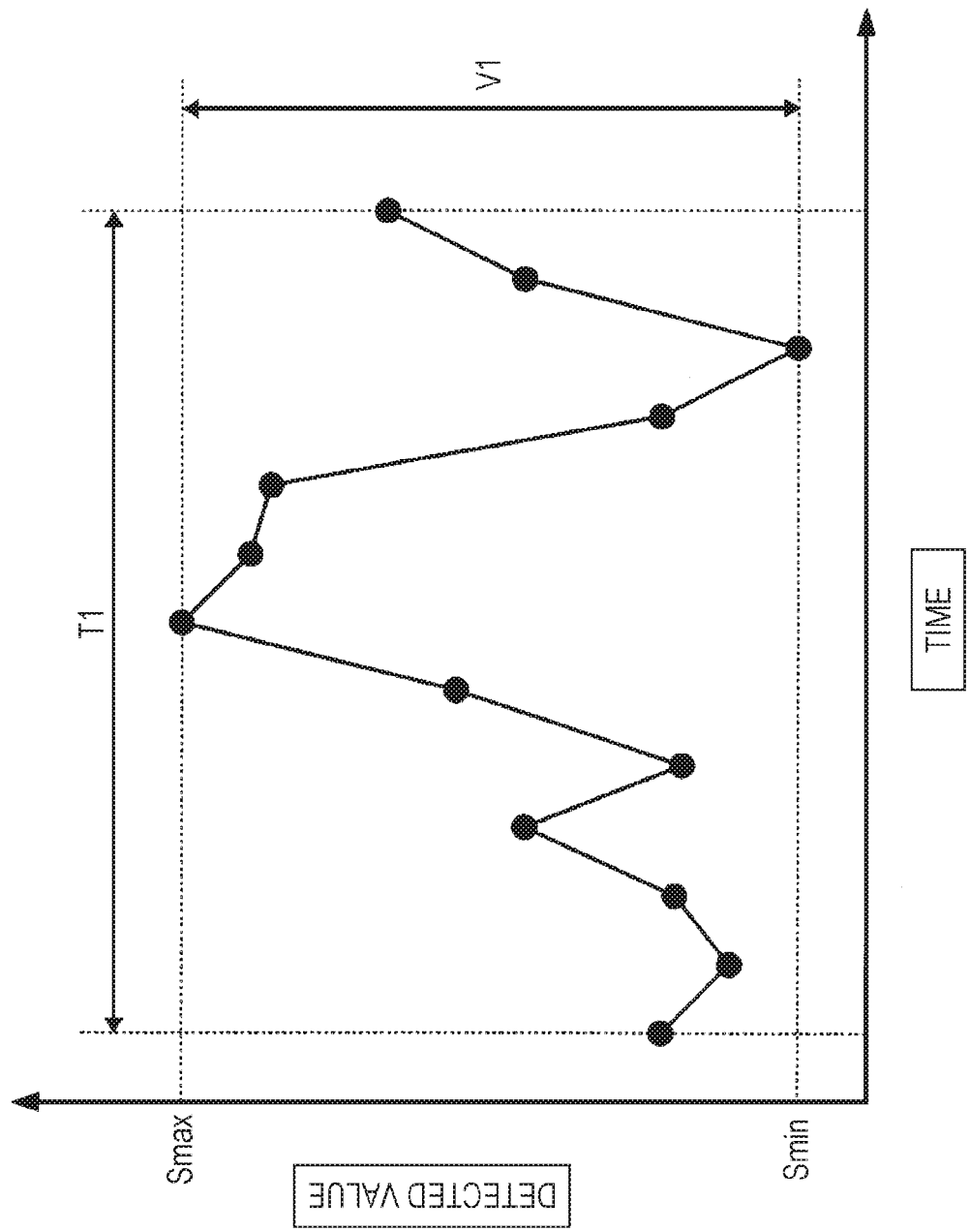

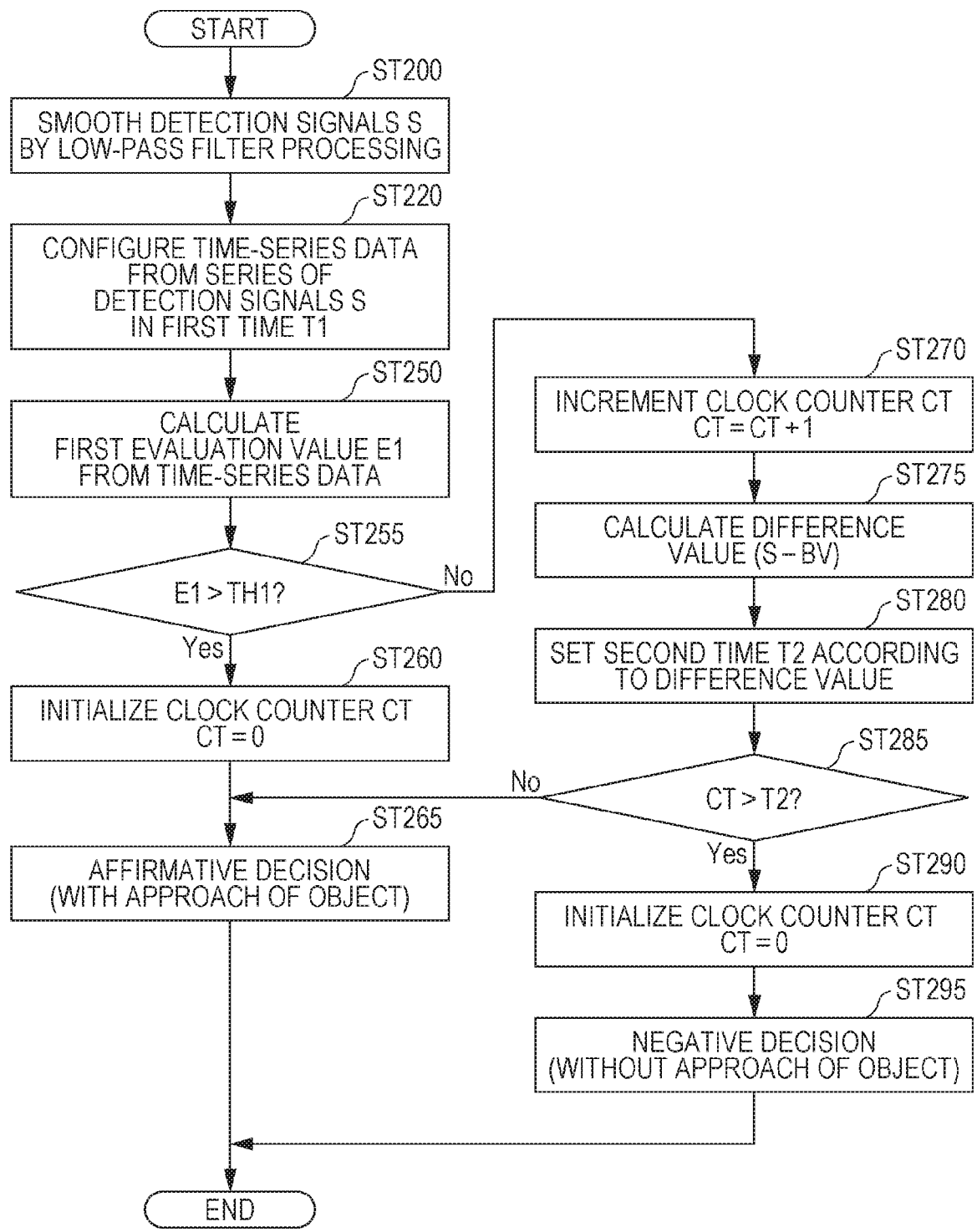

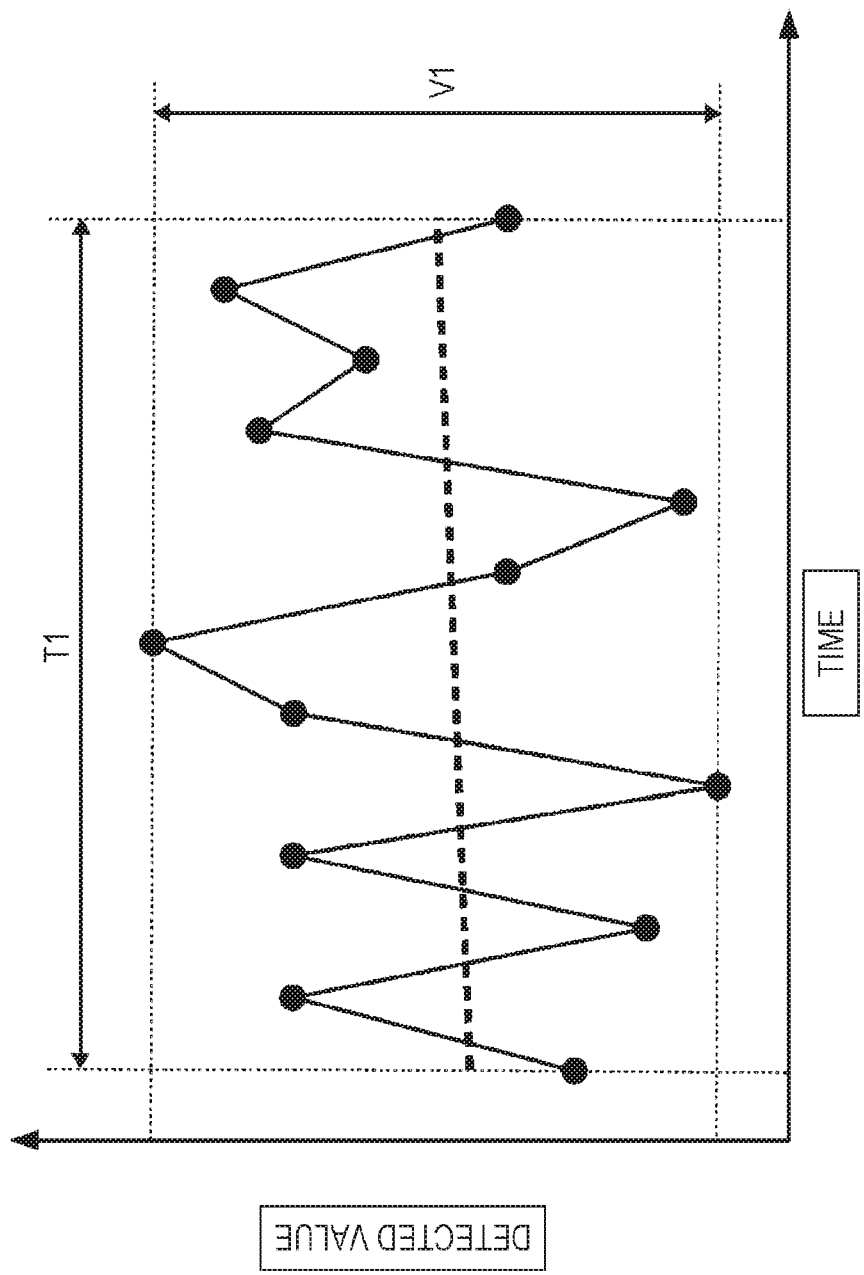

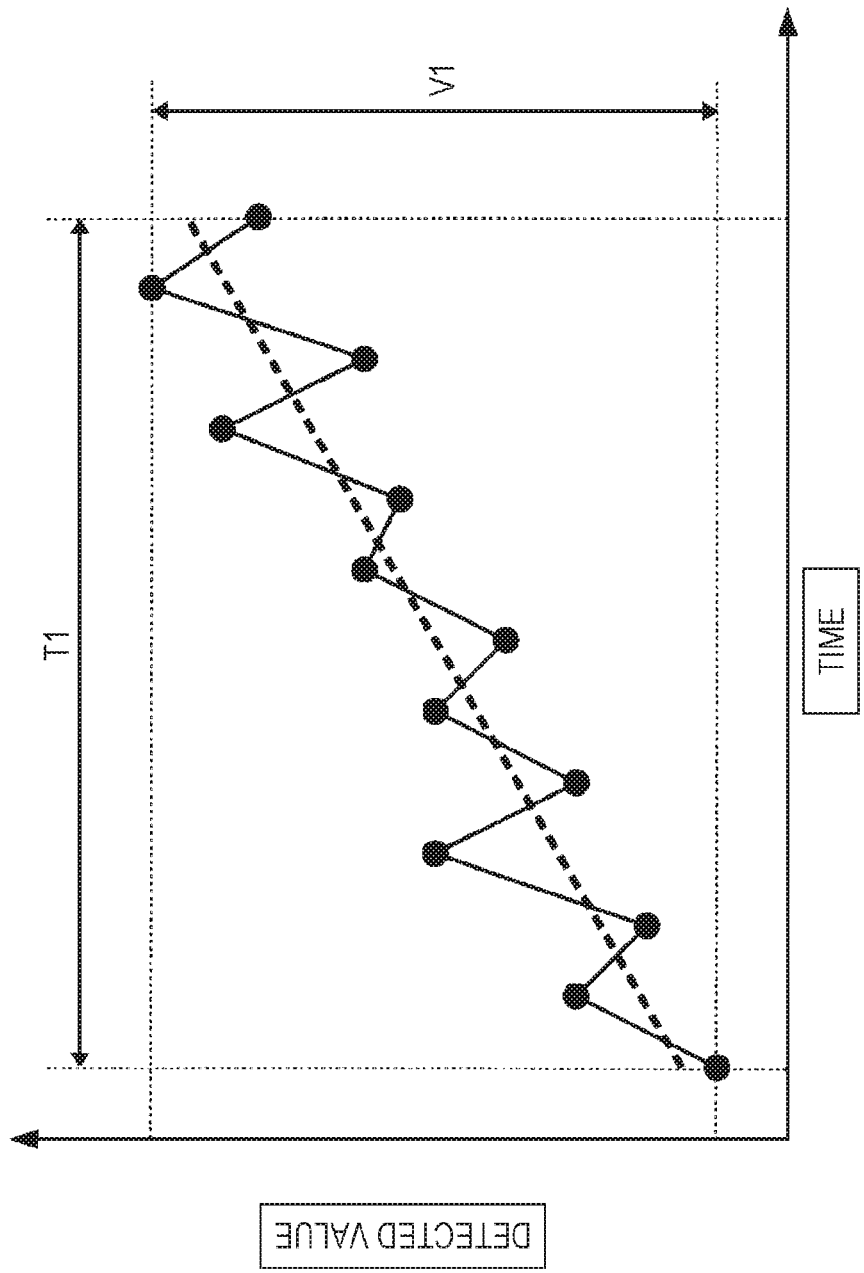

INPUT DEVICE, METHOD OF CONTROLLING INPUT DEVICE, AND PROGRAM

CLAIM OF PRIORITY

This application is a Continuation of International Application No. PCT/JP2019/005140 filed on Feb. 13, 2019, which claims benefit of Japanese Patent Application No. 2018-044504 filed on Mar. 12, 2018. The entire contents of each application noted above are hereby incorporated by reference.

BACKGROUND OF THE INVENTION

1. Field of the Invention

One aspect of the present disclosure relates to an input device, a method of controlling the input device, and a program.

2. Description of the Related Art

Sensors that detect the proximity of an object are used in devices that enter information about a manipulation by the user or other information in various electronic units. There are various types of sensors in a resistive film method, an optical method, a capacitive method, and the like as sensors that detect the proximity of an object. In smart phones and the like, for example, capacitive sensors are widely used.

Generally known capacitive sensors include self-capacitance type of sensors that detect capacitance between an object and a detection electrode and mutual-capacitance type of sensors that detect capacitance between a driving electrode and a detection electrode. Each of these sensors detects the proximity of an object according to a change in capacitance. However, a change in capacitance also occur due to a factor other than the proximity of an object, which is, for example, an environmental factor such as temperature, humidity, or the state of an object placed in the vicinity. That is, the value of capacitance detected by a sensor includes not only a component that changes due to the proximity of an object but also a component that changes due to an environmental factor. Therefore, a simple method in which the value of detected capacitance is compared with a certain threshold is problematic in that the proximity of an object can be normally detected at a certain temperature but cannot be normally detected at another temperature.

Thus, when a detected value in a capacitive sensor is used to make a decision about the state of the proximity of an object, a reference value is generally used that is set according to a detected value when a target such as a finger is not approaching (reference value is also referred to as a baseline value, calibration value, or the like). The reference value is regarded as a component that does not change according to the proximity of an object, and a relative change (differential value) in a detected value with respect to the reference is inferred to represent a state of the proximity of the object. By comparing the differential value with an appropriate threshold, it is decided whether there is proximity of an object.

In a method in which the reference value is used, even if an environment factor such as temperature changes, a mistaken decision about the state of proximity can be avoided by appropriately updating the reference value. However, if the reference value is updated in a state in which the target is approaching, this state is used as a new reference for a decision. Therefore, even if the target subsequently approaches, the approach is mistakenly decided as a non-approach. In a method in which a reference value is used, therefore, the reference value needs to be updated in an appropriate state in which the target is not approaching.

In the device described in Japanese Unexamined Patent Application Publication No. 2017-111507, when a state in which all detected values for capacitance in all sensors are within a certain range continues for a certain time or more, it is decided that a finger is not placed on the manipulation surface, after which the reference value is updated.

SUMMARY OF THE INVENTION

In the method in Japanese Unexamined Patent Application Publication No. 2017-111507 described above, however, a state in which detected values in a plurality of sensors are within a certain range is used as a timing to update the reference value. Therefore, when the detected values in the plurality of sensors is not uniform due to an environmental factor (for example, when the temperatures of the sensors are not uniform due to irradiation by sunlight or when a stationery is placed in the vicinity of some sensors), the reference value is not updated and a mistaken decision is thereby likely to be made. Another problem is that when a single sensor is used, this method cannot be applied.

In a possible example of a method of deciding a timing to update a reference value without comparing detected values in a plurality of sensors, a state in which changes in detections values are continuously small for a certain time or more is used as an update timing. In this method, if a long time during which the required state of the detected values need to continue is used as a determination condition for the update timing, an update of the reference value is delayed accordingly and a mistaken decision is thereby likely to be made. Also, if a small range of changes in detected values is used as a determination condition for the update timing, the reference value becomes less likely to be updated and a mistaken decision is thereby likely to be made. However, in a case as well in which part of the hand or the like is kept placed in the vicinity of a sensor, it is predicted that a state in which changes in detected values are relatively small is maintained. In this case, therefore, it is necessary to prevent the reference value from being updated.

In view of this, one aspect of the present disclosure provides an input device that can restrain a reference value from being updated in a state in which an object to be detected is approaching, a method of controlling the input device, and a program.

One aspect of the present disclosure provides an input device that enters information matching the proximity state of an object. This input device has: a detecting unit that generates a detection signal that changes according to the degree of the proximity of the object; a deciding unit that decides, according to a series of detection signals generated in the detecting unit, whether a change due to the proximity of the object has occurred in the detection signals; and a reference value updating unit that, if the deciding unit decides that a change due to the proximity of the object has not occurred in the detection signals, updates a reference value indicating the value of the detection signal in a state in which the object is not approaching, according to the detection signals generated in the detecting unit. The deciding unit changes a decision reference so that the higher the degree of the proximity of the object, the degree being indicated by the difference between the reference value and the value of the detection signal, is, the more likely the deciding unit is to decide that a change due to the proximity of the object has occurred in the detection signals.

According to one aspect of the present disclosure, it is possible to provide an input device that can restrain a reference value from being updated in a state in which an object to be detected is approaching, a method of controlling the input device, and a program.

BRIEF DESCRIPTION OF THE DRAWINGS

FIG. 6 illustrates an example of the difference between a maximum value and a minimum value of the detection signal in a first time;

FIG. 7 is a flowchart used to describe an example of a variation of decision processing in the deciding unit in the input device according to the first embodiment;

FIG. 8A illustrates an example of a regression line that approximates a change in the detection signals in the first time;

FIG. 8B also illustrates an example of a regression line that approximates a change in the detection signals in the first time;

DESCRIPTION OF THE PREFERRED EMBODIMENTS

First Embodiment

An input device according to a first embodiment will be described below with reference to the drawings.

Figure 1:
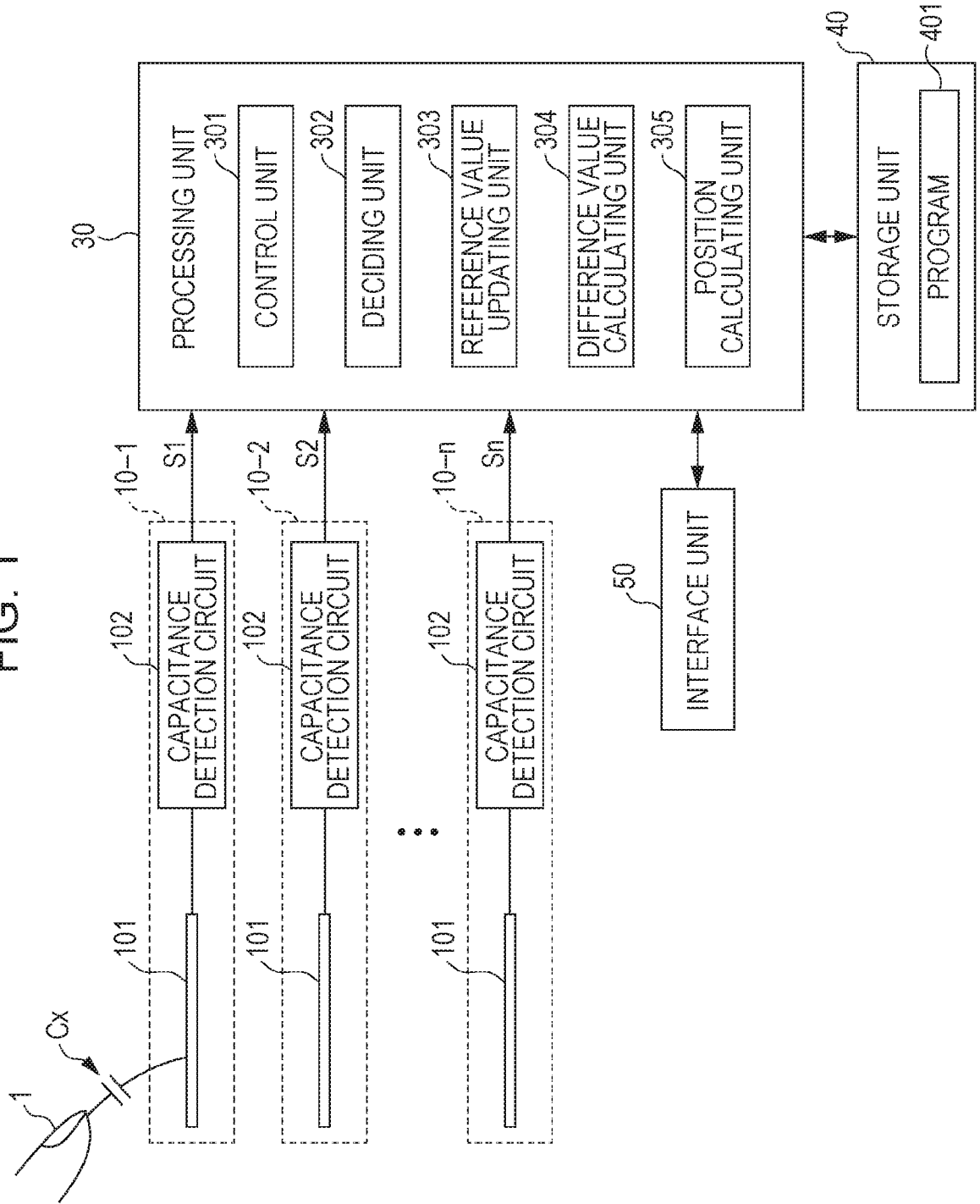
FIG. 1 illustrates an example of the structure of an input device according to a first embodiment.
Figure 2:
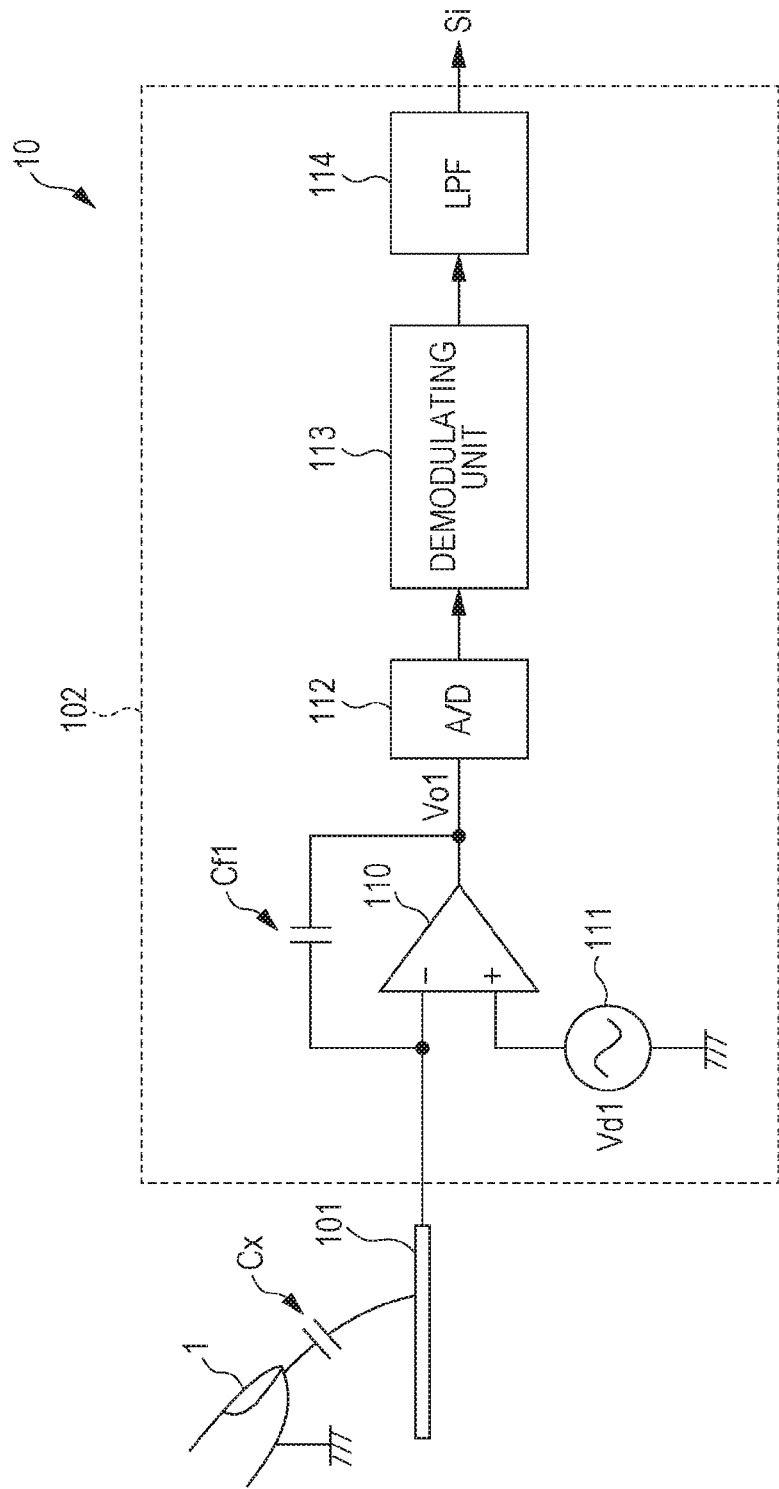
FIG. 2 illustrates an example of the structure of a detecting unit.

FIG. 1 illustrates an example of the structure of an input device according to the first embodiment. The input device indicated in FIG. 1 has n detecting units 10-1 to 10-$n$ (sometimes referred to below as detecting units 10 without being distinguished), a processing unit 30, a storage unit 40, and an interface unit 50. FIG. 2 illustrates an example of the structure of the detecting unit 10.

The input device according to this embodiment is a device that enters information matching the degree of the proximity of an object such as a finger or pen. For example, the input device enters information as to whether there is a contact of an object on a manipulation surface, the position of a contact, the degree of proximity, and the like. In this description, the term "proximity" refers to closeness and applies regardless of whether there is a contact.

<Detecting Unit 10>

The detecting unit 10-$i$ (i is an integer from 1 to n) generates a detection signal Si (sometimes referred to below as the detection signal S without being distinguished) matching the degree of the proximity of an object 1 such as a finger. The detecting unit 10 repetitively generates the detection signal S under control of a control unit 301, described below, in the processing unit 30.

The detecting unit 10 includes a detection electrode 101 and a capacitance detection circuit 102 as illustrated, for example, in FIG. 2. The detection electrode 101 forms a capacitor Cx, the capacitance of which being changed depending on the degree of the proximity of the object 1. The capacitor Cx is a parasitic capacitive component formed between the detection electrode 101 and the object 1, such as a finger, which can be regarded as ground from the viewpoint of alternating current. The closer the object 1 is to the detection electrode 101, the larger the capacitance of the capacitor Cx is.

The capacitance detecting unit 102 generates the detection signal S matching the capacitance of the capacitor Cx according to charge in the capacitor Cx, the charge being transferred through the detection electrode 101. The capacitance detecting unit 102 includes an operational amplifier 110, a driving voltage supply unit 111, a capacitor Cf1, an analog-digital converter (referred to below as the AD converter) 112, a demodulating unit 113, and a low-pass filter 114 as illustrated, for example, in FIG. 2.

The capacitor Cf1 is connected between the inverting input terminal and output terminal of the operational amplifier 110. An alternating-current driving voltage Vd1 is supplied to the non-inverting input terminal of the operational amplifier 110 by the driving voltage supply unit 111. The detection electrode 101 is connected to the non-inverting input terminal of the operational amplifier 110. The driving voltage Vd1 of the driving voltage supply unit 111 is, for example, a sinusoidal alternating-current voltage. Since the operational amplifier 110 controls an output voltage Vo1 so that the voltage at the inverting input terminal and the voltage at the non-inverting input terminal substantially match, an alternating-current voltage substantially the same as the driving voltage Vd1 is generated in the capacitor Cx. When an alternating-current voltage is generated in the capacitor Cx, a charge change occurs in proportion to this alternating-current voltage and the capacitance of the capacitor Cx. A change in charge in the capacitor Cx is substantially the same as a change in charge in the capacitor Cf1. As a result, an alternating-current voltage generated in the capacitor Cf1 has an amplitude substantially proportional to the capacitance of the capacitor Cx. The output voltage Vo1 of the operational amplifier 110 is equivalent to the sum of the driving voltage Vd1 and the alternating-current voltage generated in the capacitor Cf1.

The AD converter 112 converts the output voltage Vo1 of the operational amplifier 110 to a digital value. For example, the AD converter 112 includes a differential amplifier that amplifies the difference between the driving voltage Vd1 of the driving voltage supply unit 111 and the output voltage Vo1 of the operational amplifier 110. The AD converter 112 converts an output signal (signal equivalent to the alternating-current voltage of the capacitor Cf1) from this differential amplifier to a digital value.

The demodulating unit 113 demodulates the signal converted to a digital value in the AD converter 112 and extracts a component equivalent to the amplitude of the alternating-current voltage of the capacitor Cf1, that is, a component proportional to the capacitance of the capacitor Cx. For example, the demodulating unit 113 multiplies the signal converted to a digital value in the AD converter 112 by an alternating-current voltage having substantially the same phase as the driving voltage Vd1. The low-pass filter 114 removes a harmonic component resulting from multiplication processing in the demodulating unit 113 and a noise component resulting from aliasing in the AD converter 112. Accordingly, the detection signal S output from the low-pass filter 114 is a signal substantially proportional to the capacitance of the capacitor Cx.

<Processing Unit 30>

The processing unit 30 is a circuit that controls the entire operation of the input device. For example, the processing unit 30 includes a computer that performs processing according to instruction code in a program 401 stored in the storage unit 40, and also includes special hardware, such as a logic circuit or the like, configured to implement specific functions. All of processing in the processing unit 30 may be implemented by the computer according to the program 401, or at least part of the processing may be implemented by the special hardware.

The processing unit 30 periodically acquires the detection signal S from each detecting unit 10, and calculates the difference between a reference value BV and the value of the detection signal S for each detecting unit 10. Then, the processing unit 30 performs processing to make a decision about the proximity state of the object 1 in each detecting unit 10 (specifically, each detection electrode 101). The processing unit 30 also performs processing to calculate the reference value BV for each detecting unit 10 according to the detection signal S in a state in which the object 1 is not approaching.

The processing unit 30 includes a control unit 301, a deciding unit 302, a reference value updating unit 303, a difference value calculating unit 304, and a position calculating unit 305 as illustrated, for example, in FIG. 1.

The control unit 301 controls generation of the detection signals S1 to Sn in the detecting units 10-1 to 10-n. For example, the control unit 301 controls each of the detecting units 10-1 to 10-n so that generation of the driving voltage Vd1 in the driving voltage supply unit 111, analog-digital conversion in the AD converter 112, and digital signal processing in the demodulating unit 113 and low-pass filter 114 are performed at appropriate timings. The control unit 301 periodically acquires the detection signal S from each the detecting unit 10 and stores the value of the detection signal S in the storage unit 40.

The deciding unit 302 makes a decision as to whether to update the reference value BV in the reference value updating unit 303, which will be described later. Specifically, according to a series of detection signal S generated in each detecting units 10, the deciding unit 302 makes a decision for each detecting units 10 as to whether a change due to the proximity of the object 1 has occurred in the detection signals S.

The deciding unit 302 also changes a decision reference so that the higher the degree of the proximity of the object 1, the degree being indicated by the difference between the reference value BV and the value of the detection signal S, is, the more likely the deciding unit 302 is to decide that a change due to the proximity of the object 1 has occurred in the detection signals S. Generally, the higher the degree of the proximity of the object 1, the degree being indicated by the difference between the reference value BV and the value of the detection signal S, is, the higher the probability is that a change due to the proximity of the object 1 has occurred in the detection signals S rather than due to an environmental factor such as temperature. Therefore, when the decision reference is changed as described above, if the probability is high that the object 1 is approaching, it becomes likely that the decision is made that a change due to the proximity of the object 1 has occurred in the detection signals S. As a result, in a state in which the object 1 is approaching, the reference value BV becomes less likely to be updated in the reference value updating unit 303, which will be described later.

For example, the deciding unit 302 repeats processing in which the deciding unit 302 calculates a first evaluation value E1, which indicates the magnitude of a change in the detection signals S in a first time T1, and decides whether this first evaluation value E1 is included in a predetermined range (referred to below as the first range). If the first evaluation value E1 is included in the first range, the probability is high that the magnitude of the change in the detection signals S is relatively small and a change due to the proximity of the object 1 has not occurred in the detection signals S. While repeating this processing, the deciding unit 302 measures the duration of a state (sometimes referred to below as the stable state of the detection signals S) in which the first evaluation value E1 is included in the first range. When the duration of the stable state of the detection signal S reaches or exceeds a second time T2, the deciding unit 302 decides that a change due to the proximity of the object 1 has not occurred in the detection signals S.

The deciding unit 302 changes the second time T2 according the degree of the proximity of the object 1, the degree being indicated by the difference between the reference value BV and the value of the detection signal S. Specifically, the higher the degree of the proximity of the object 1, the degree being indicated by the difference between the reference value BV and the value of the detection signal S, is, the more the deciding unit 302 prolongs the second time T2. When the second time T2 is prolonged, a change in the detection signals S in the first time T1 is likely to deviate from the first range. Therefore, the deciding unit 302 becomes likely to decide that a change due to the proximity of the object 1 has occurred in the detection signals S.

As the first evaluation value E1, which indicates the magnitude of a change in the detection signals S in the first time T1, the deciding unit 302 calculates, for example, a value representing the magnitude of non-uniformity in detection signals S with respect to the average of the detection signals S in the first time T1. Specifically, the deciding unit 302 calculates, as the first evaluation value E1, a value matching the dispersion or standard deviation of detection signals S in the first time T1.

When the deciding unit 302 decides that a change due to the proximity of the object 1 has not occurred in the detection signals S, the reference value updating unit 303 updates the reference value BV indicating the value of the detection signal S in the state in which the object 1 is not approaching, according to the detection signals S generated in the detecting unit 10. For example, the reference value updating unit 303 acquires, as a new reference value BV, the value of the detection signal S generated when the deciding unit 302 decides that a change due to the proximity of the object 1 has not occurred in the detection signals S or the average of the values of a series of detection signals S in a state in which the deciding unit 302 decides that a change due to the proximity of the object 1 has not occurred in the detection signals S.

The difference value calculating unit 304 calculates the difference (S−BV) between the reference value BV and the value of the detection signal S as the difference value. Assuming that the higher the degree of the proximity of the object 1 is, the larger the value of the detection signal S is, the higher the degree of the proximity of the object 1 is, the larger the difference value (S−BV) is.

The position calculating unit 305 calculates a position at which the object 1 such as a finger has approached, according to the detection signals S1 to Sn generated in the detecting units 10-1 to 10-*n*. For example, the detection electrodes 101 in the detecting units 10-1 to 10-*n* are placed on the manipulation surface that the object 1 approaches, so as to be arranged in two directions (X direction and Y direction). The position calculating unit 305 calculates the proximity position (coordinate in the X direction and coordinate in the Y direction) of the object 1 on the manipulation surface, according to a distribution of a group of detection signals S corresponding to detection electrodes 101 arranged in the X direction and a distribution of a group of detection signals S corresponding to detection electrodes 101 arranged in the Y direction.

<Storage Unit 40>

The storage unit 40 stores constant data used in processing in the processing unit 30 and variable data temporarily referenced in a process of processing. The storage unit 40 also stores the program 401 executed by a computer in the processing unit 30. The storage unit 40 includes, for example, one or more of a volatile memory such as a dynamic random access memory (DRAM) or static random access memory (SRAM), a non-volatile memory such as a flash memory, and a magnetic storage device such as a hard disk drive.

<Interface Unit 50>

The interface unit 50 is a circuit used to transmit and receive data between the input device and another control device (such as an integrated circuit (IC) chip for use for control of an electronic unit in which the input device is mounted). The processing unit 30 outputs information (such as information about the coordinates of the object 1) stored in the storage unit 40, from the interface unit 50 to a control device (not illustrated). The interface unit 50 may acquire the program 401 executed by the computer in the processing unit 30 from a non-temporary storage medium such as an optical disc or a universal serial bus (USB) memory or from a server on a network, and may load the program 401 in the storage unit 40.

<Operation>

Here, the operation of the input device having the structure described above will be described with reference to FIGS. 3 to 5.

Figure 3:
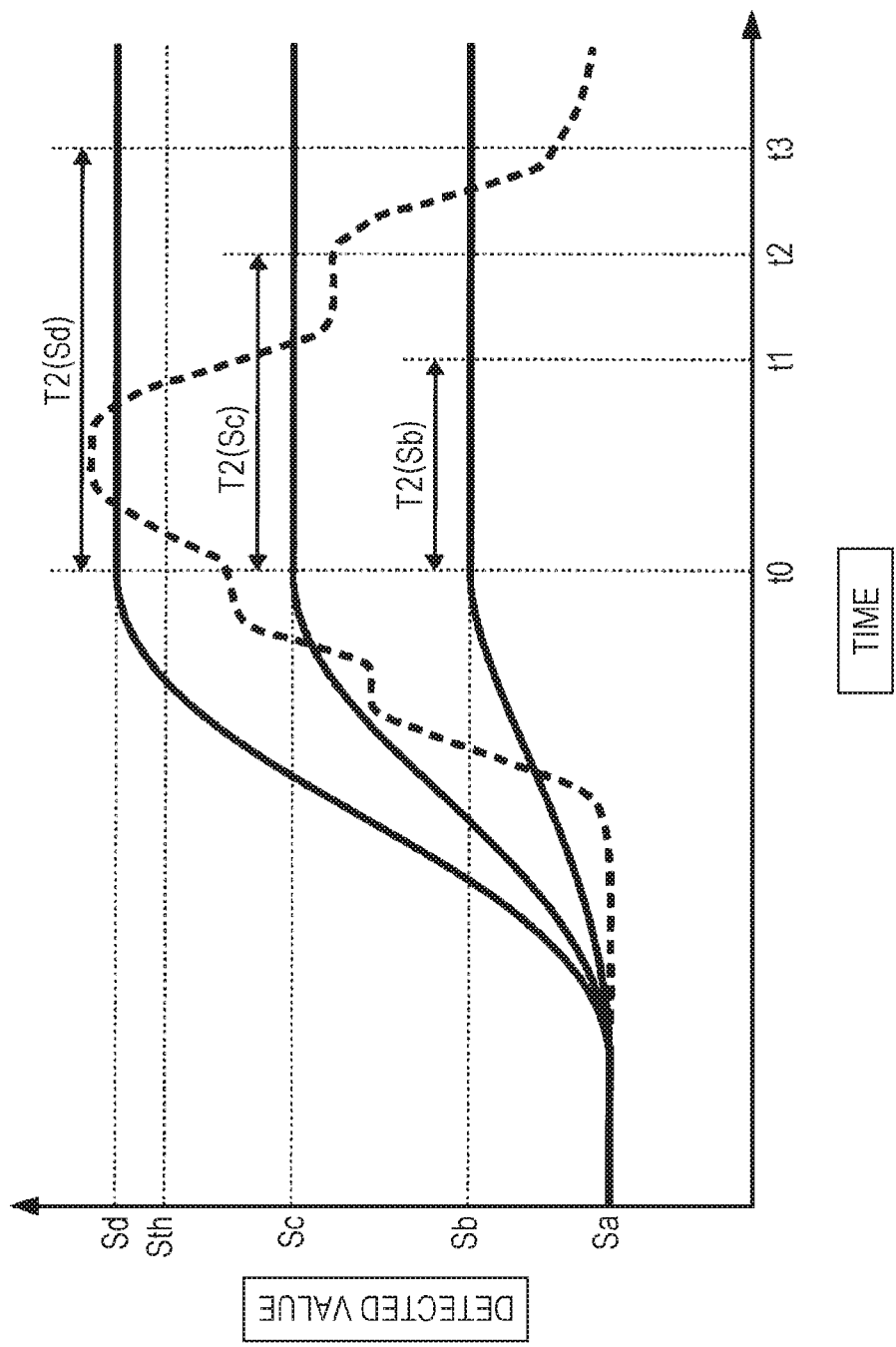
FIG. 3 illustrates a relationship between a second time and the magnitudes of detection signals.

FIG. 3 illustrates a relationship between the magnitudes of detection signals S and the settings of the second time T2. The three solid lines in FIG. 3 each represent a detection signal S that changes with the elapse of time due to an environmental factor. In an initial state in the example in FIG. 3, the value (detected value) of each detection signal S is Sa, after which the value is increased with the elapse of time. From time t0 at which the detection signals S reached Sb, Sc, and Sd, they are placed in a stable state. The detected value Sb is the smallest, followed by Sc and Sd in that order. The deciding unit 302 prolongs the second time T2 so that the larger the difference between the reference value BV and the value of the detection signal S is (that is, the larger the detected value is), the longer the second time T2 is. In the example in FIG. 3, therefore, the second time T2(Sb) at the detected value Sb is the shortest and the second time T2(Sd) at the detected value Sd is the longest.

Therefore, as a time at which it is decided that a change due to the proximity of the object 1 has not occurred in the detection signals S, the time at which the detection signal S entered the stable state at the detected value Sb is the earliest (time t1), and the time at which the detection signal S entered the stable state at the detected value Sd is the latest (time t3). Therefore, the larger the value of the detection signal S is (the higher the degree of the proximity of the object 1 is), the less likely it is to obtain the decision that a change due to the proximity of the object 1 has not occurred in the detection signals S and the more likely it is to avoid a mistaken decision in a state in which the object 1 is approaching. In contrast, the smaller the value of the detection signal S is (the smaller the degree of the proximity of the object 1 is), the more likely it is to obtain the decision that a change due to the proximity of the object 1 has not occurred in the detection signals S, and a time taken until a decision is obtained is shortened.

Figure 4:
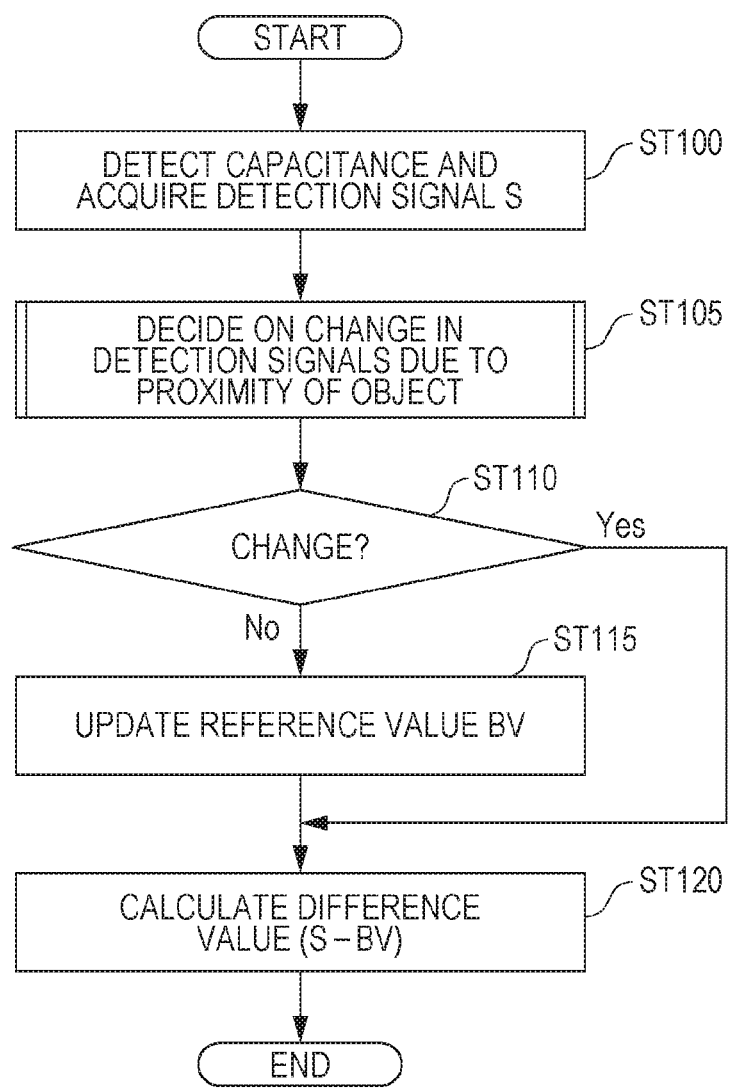
FIG. 4 is a flowchart used to describe an example of processing from when the detection signal is acquired in the input device according to the first embodiment until a differential value is calculated.

FIG. 4 is a flowchart used to describe an example of processing from when the detection signal S is acquired until a differential value (S−BV) is calculated. The input device repetitively executes processing indicated in FIG. 4 for each of n detecting units 10 at a certain cycle.

First, a capacitance is detected in the detecting unit 10, after which the control unit 301 acquires a detection signal S generated as a detection result (ST100). According to the detection signal S generated in the detecting unit 10, the deciding unit 302 decides whether a change due to the proximity of the object 1 has occurred in the detection signals S (ST105). If the deciding unit 302 decides that a change due to the proximity of the object 1 has not occurred in the detection signals S (No in ST110), the reference value updating unit 303 calculates a new reference value BV according to the detection signal S acquired in step ST100 and replaces the previous reference value BV with the new reference value BV (ST115). The difference value calculating unit 304 calculates the difference value (S−BV) between the reference value BV and the value of the detection signal S acquired in step ST100, and stores the difference value in the storage unit 40 (ST120).

Figure 5:
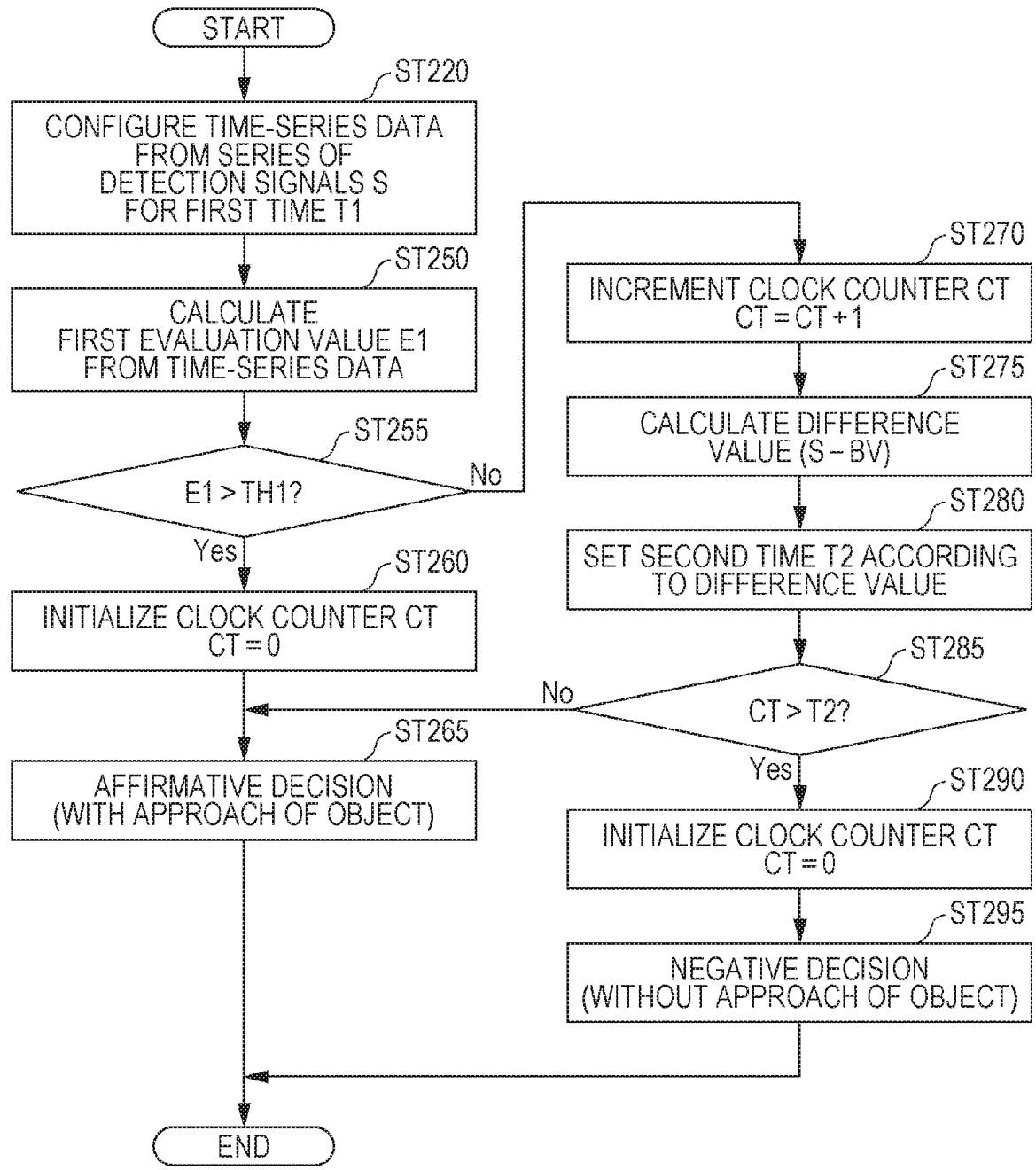
FIG. 5 is a flowchart used to describe an example of decision processing in a deciding unit in the input device according to the first embodiment.

FIG. 5 is a flowchart used to describe an example of decision processing (ST105 in FIG. 4) in the deciding unit 302. The deciding unit 302 reads out the values of a series of detection signals S, in the first time T1, including the latest detection signal S from the storage unit 40, and configures time-series data for use for decision (ST220). Then, the deciding unit 302 calculates the first evaluation value E1 (for example, dispersion or standard deviation of detection signals S in the first time T1), which represents the magnitude of a change in the detection signals S in the first time T1, from this time-series data (ST250).

The deciding unit 302 compares the first evaluation value E1 calculated in step ST250 with a first threshold value TH1.

If the first evaluation value E1 is larger than the first threshold value TH1 (Yes in ST255), the deciding unit 302 initializes a clock counter CT to zero (ST260). Since, in this example, a range in which the first evaluation value E1 is smaller than the first threshold value TH1 is the first range described above, if the first evaluation value E1 is larger than the first threshold value TH1, the first evaluation value E1 is outside the first range. Therefore, the deciding unit 302 decides that a change due to the proximity of the object 1 has occurred in the detection signals S (ST265).

If the first evaluation value E1 is equal to or smaller than the first threshold value TH1 (No in ST255), the first evaluation value E1 is included in the first range and the detection signal S is in the stable state, so the deciding unit 302 increments the clock counter CT used to measure the duration of the stable state (ST270).

Next, the deciding unit 302 calculates the difference between the current reference value BV and the value of the detection signal S acquired in step ST100 as the difference value (S−BV) (ST275). The deciding unit 302 sets the second time T2 according to the calculated difference value (S−BV) (ST280). The second time T2 is a numeric value corresponding to the value of the clock counter CT, which is cyclically incremented. The deciding unit 302 calculates the second time T2 according to, for example, a predetermined function (such as a linear function) that uses the difference value (S−BV) as a variable so that the larger the difference value (S−BV) is, the larger the value of the second time T2 is. Alternatively, the deciding unit 302 may acquire the second time T2 corresponding to the calculated difference value (S−BV), according to a predetermined data table in which a correspondence relationship between the difference value (S−BV) and the second time T2 is stipulated.

The difference value (S−BV) used by the deciding unit 302 to set the second time T2 may be a single difference value (S−BV) calculated for the detection signal S from a single detecting unit 10 or may be the sum or average of n difference values (S−BV) calculated for detection signals S from n detecting units 10.

The deciding unit 302 compares the clock counter CT with the second time T2 set in step ST280. If the clock counter CT exceeds the second time T2 (Yes in ST285), the deciding unit 302 initializes the clock counter CT to zero (ST290). In this case, the deciding unit 302 decides that a change due to the proximity of the object 1 has not occurred in the detection signals S (ST295).

If the clock counter CT does not exceed the second time T2 (No in ST285), the duration of the stable state of the detection signal S has not reached the reference, so the deciding unit 302 decides that a change due to the proximity of the object 1 has occurred in the detection signals S (ST265). In this case, however, the deciding unit 302 maintains the clock counter CT without initializing it. Therefore, while the state in which the first evaluation value E1 is equal to or smaller than the first threshold value TH1 (No in ST255) continues, the deciding unit 302 repeatedly increments the clock counter CT (ST270) at a certain cycle.

As described above, with the input device according to this embodiment, it is decided, according to a series of detection signals S that change depending on the degree of the proximity of the object 1, whether a change due to the proximity of the object 1 has occurred in the detection signals S. If it is decided that a change due to the proximity of the object 1 has not occurred in the detection signals S, the reference value BV, which indicates the value of the detection signal S in a state in which the object 1 is not approaching, is updated. Then, the decision reference is changed so that the higher the degree of the proximity of the object 1, the degree being indicated by the difference value (S−BV) between the reference value BV and the value of the detection signal S, is, the more likely the decision is to be made that a change due to the proximity of the object 1 has occurred in the detection signals S. When the degree of the proximity of the object 1, the degree being indicated by the difference value (S−BV) between the reference value BV and the value of the detection signal S, is high, the probability is high that this difference value (S−BV) is not due to an environmental factor such as temperature but is due to the proximity of the object 1.

Therefore, when the decision reference is changed as described above, if the probability is high that the object 1 is approaching, it becomes likely that the decision is made that a change due to the proximity of the object 1 has occurred in the detection signals S. As a result, the reference value BV becomes less likely to be updated in a state in which the object 1 is approaching, making it possible to effectively avoid a mistaken decision about the proximity state of the object 1 due to an inappropriate change of the reference value By.

Also, the lower the degree of the proximity of the object 1, the degree being indicated by the difference value (S−BV) between the reference value BV and the value of the detection signal S, is, the more likely it is to update the reference value By. Therefore, if the probability is low that the object 1 is approaching, a timing to update the reference value BV can be moved up. Therefore, it can be effectively avoided that the proximity state of the object 1 is mistakenly decided because of a delay in updating the reference value BV in response to an environmental change.

Next, a variation of the input device according to the first embodiment will be described.

FIG. 6 illustrates an example of a difference V1 between a maximum value Smax and a minimum value Smin of the detection signals S in the first time T1. In the above description, a dispersion or standard deviation has been taken as an example of the first evaluation value E1 calculated by the deciding unit 302. However, the first evaluation value E1 suffices if it represents the magnitude of a change in the detection signals S in the first time T1. For example, the difference V1 as illustrated in FIG. 6 may be used as the first evaluation value E1.

The deciding unit 302 decides whether there is proximity of the object 1 according to the magnitude of a change in the detection signals S. To increase precision in decision, therefore, components, of the detection signal S, that have a significantly high frequency when compared with the motion of the object 1 (for example, a human body) have been preferably attenuated. Thus, the deciding unit 302 may perform low-pass filter processing to smooth detection signals S as illustrated in the flowchart in FIG. 7 (ST200), may configure time-series data from the detection signals S smoothed in low-pass filter processing (ST220), and may calculate the first evaluation value E1 that represents the magnitude of a change in the detection signals S in the first time T1 (ST250).

Second Embodiment

Next, an input device according to a second embodiment will be described. In the input device according to the second embodiment, decision processing in the deciding unit 302 in the input device according to the first embodiment described above is partially modified. Other points in the structure are the same as in the input device according to the first embodiment. In the description below, differences from the input device according to the first embodiment will be mainly described.

FIGS. 8A and 8B each illustrates an example of a regression line that approximates a change in the detection signals S in the first time T1. In FIGS. 8A and 8B, the dotted line indicates a regression line. In the example in FIG. 8A, the detected values of the detection signals S that have no correlation with respect to the regression line have large non-uniformity, and the regression line has a small inclination (values on the regression line are close to the average value). In the example in FIG. 8B, the correlation of the detection signals S with respect to the regression line is higher than in the example in FIG. 8A and the inclination of the regression line is large. When the detection signals S indicate a trend of a linear change as illustrated in FIG. 8B, the probability is high that when the temperature of the detecting unit 10 changes due to the proximity of the object 1 such as a finger, a drift of the detection signals S has occurred.

In view of this, the deciding unit 302 in the input device according to this embodiment calculates the inclination A of a regression line that approximates a change in the detection signals S in the first time T1, and changes the first time T1 so that the larger the inclination A of the regression line is, the more likely the deciding unit 302 is to decide that a change due to the proximity of the object 1 has occurred in the detection signals S. Specifically, the deciding unit 302 prolongs the first time T1 so that the larger the inclination A of the regression line is, the longer the first time T1 is. When the first time T1 is prolonged, the change in the detection signals S in the first time T1 becomes large and the first evaluation value E1 becomes likely to deviate from the first range, so the deciding unit 302 becomes likely to decide that a change due to the proximity of the object 1 has occurred in the detection signals S. As a result, it becomes easy to restrain the reference value BV from being updated in a state in which the object 1 is approaching.

Figure 9:
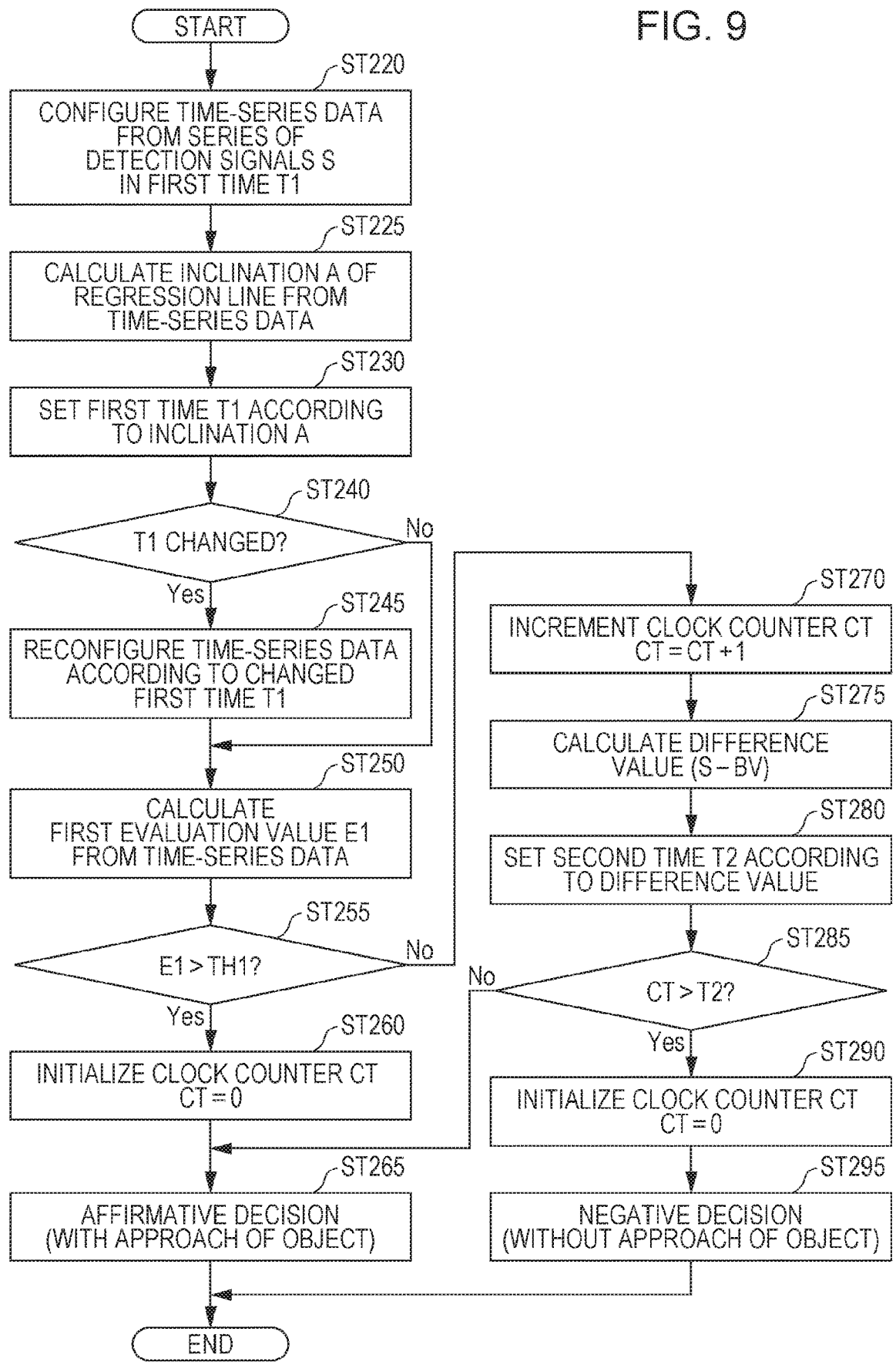
FIG. 9 is a flowchart used to describe an example of decision processing in the deciding unit in the input device according to a second embodiment.

FIG. 9 is a flowchart used to describe an example of decision processing in the deciding unit 302 in the input device according to the second embodiment. In the flowchart indicated in FIG. 9, steps ST225 to ST245 are added to the flowchart indicated in FIG. 5. Other steps are the same as in the flowchart indicated in FIG. 5.

The deciding unit 302 configures time-series data of detection signals S in the first time T1 in step ST220, after which the deciding unit 302 calculates the inclination A of the regression line from this time-series data (ST225). The deciding unit 302 then sets the first time T1 according to the calculated inclination A of the regression line (ST230). The first time T1 is a numeric value corresponding to the number of detection signals S constituting the time-series data. The deciding unit 302 calculates the first time T1 according to, for example, a predetermined function (such as a linear function) that uses the inclination A as a variable so that the larger the inclination A is, the larger the value of the first time T1 is. Alternatively, the deciding unit 302 may acquire the first time T1 corresponding to the calculated inclination A, according to a predetermined data table in which a correspondence relationship between the inclination A and the first time T1 is stipulated. The deciding unit 302 may also select one from two values determined in advance as the value of the first time T1, according to the result of a comparison between the inclination A and a predetermined threshold value.

If the first time T1 is changed in step ST230 (Yes in ST240), the deciding unit 302 reconfigures the time-series data of detection signals S according to the new first time T1 (ST245). Processing in step ST250, in which the first evaluation value E1 is calculated from the time-series data, and later steps is the same as in the flowchart indicated in FIG. 4, so descriptions will be omitted.

With the input device according to this embodiment, the decision reference in the deciding unit 302 is changed in additional consideration of the linearity of changes in detection signals S besides the difference value (S−BV) between the reference value BV and the value of the detection signal S. This makes it possible to more effectively avoid a mistaken decision about the proximity state of the object 1 due to an inappropriate change of the reference value BV, and to more effectively avoid a mistaken decision about the proximity state of the object 1 due to a delay in updating the reference value BV in response to an environmental change.

Next, a variation of the input device according to the second embodiment will be described with reference to the flowchart in FIG. 10.

In the example described above, the inclination A of a regression line of detection signals S in the first time T1 has been used to evaluate the linearity of changes in detection signals S. To evaluate the linearity, the degree of approximation between the detection signal S and its inferred value based on a regression line, for example, can be used besides the inclination A of a regression line. This degree of approximation is, for example, a coefficient of determination or the like, the coefficient being calculated from residuals between detected values and inferred values based on a regression line. Thus, the deciding unit 302 in this variation calculates a second evaluation value E2 (such as a coefficient of determination) that represents the degree of approximation between the detection signal S and its inferred value based on a regression line, and changes the first time T1 so that the larger the approximation degree represented by the second evaluation value E2 is, the more likely the deciding unit 302 is to decide that a change due to the proximity of the object 1 has occurred in the detection signals S.

Figure 10:
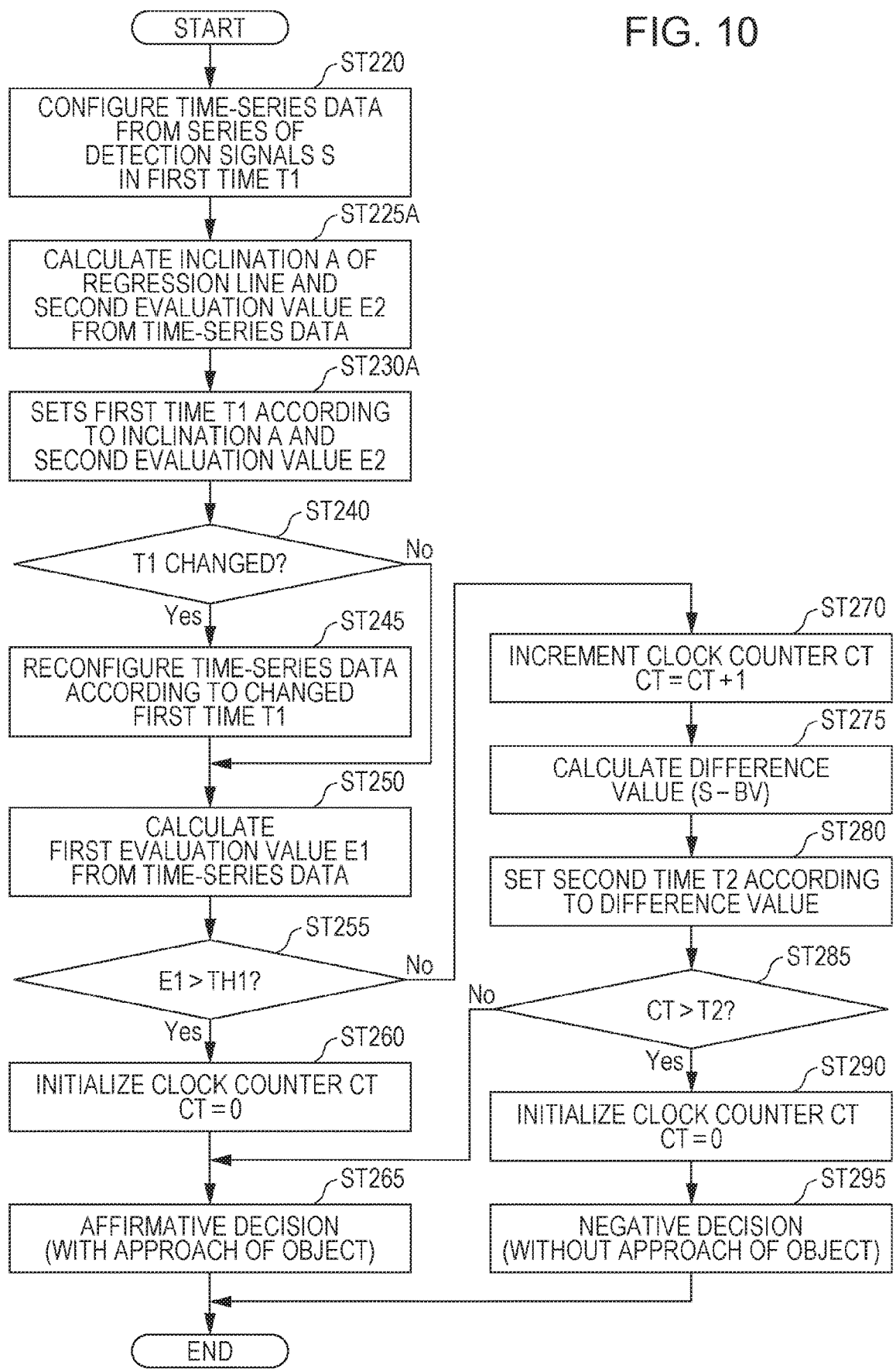
FIG. 10 is a flowchart used to describe an example of a variation of decision processing in the deciding unit in the input device according to the second embodiment.

In the flowchart indicated in FIG. 10, steps ST225 and ST230 in the flowchart indicated in FIG. 9 are replaced with steps ST225A and ST230A. Other steps are the same as in the flowchart indicated in FIG. 9.

The deciding unit 302 configures time-series data of detection signals S in the first time T1 in step ST220, after which the deciding unit 302 calculates, from this time-series data, the inclination A of the regression line and the second evaluation value E2 such as a coefficient of determination (ST225A). The deciding unit 302 then sets the first time T1 according to the calculated inclination A of the regression line and the second evaluation value E2 (ST230A). For example, according to a predetermined function that uses the inclination A and second evaluation value E2 as variables, the deciding unit 302 sets the first time T1 so that the larger the inclination A is, the larger the value of the first time T1 is, and that the larger the approximation degree represented by the second evaluation value E2 is, the larger the value of the first time T1 is.

Alternatively, the deciding unit 302 may acquire the first time T1 corresponding to the inclination A and second evaluation value E2 according to a predetermined data table in which correspondence relationships between the inclination A and the first time T1 and between the second evaluation value E2 and the first time T1 are stipulated. The deciding unit 302 may also select one from two values determined in advance as the value of the first time T1, according to the results of comparisons between the inclination A and a predetermined threshold value and between the second evaluation value E2 and a predetermined threshold value.

When the linearity of changes in detection signals S is evaluated as described above by using the second evaluation value E2 that represents the degree of approximation between the detection signal S and its inferred value based on a regression line, whether a change due to the proximity of the object 1 has occurred in the detection signals S can be more accurately decided. This makes it possible to avoid an update of the reference value BV in a state in which the object 1 is approaching.

Third Embodiment

Next, an input device according to a third embodiment will be described. In the input device according to the third embodiment, decision processing in the deciding unit 302 in the input device according to the second embodiment described above is partially modified. Other points in the structure are the same as in the input device according to the second embodiment. In the description below, differences from the input device according to the second embodiment will be mainly described.

The deciding unit 302 in the input device according to the second embodiment has changed the first time T1 according to the inclination A of the regression line of detection signals S in the first time T1. In contrast to this, the deciding unit 302 in the input device according to the third embodiment changes the first range, which is a reference in making a decision about the first evaluation value E1, according to the inclination A of the regression line. Specifically, the deciding unit 302 narrows the first range so that the larger the inclination A of the regression line is, the more likely the deciding unit 302 is to decide that a change due to the proximity of the object 1 has occurred in the detection signals S.

Figure 11:
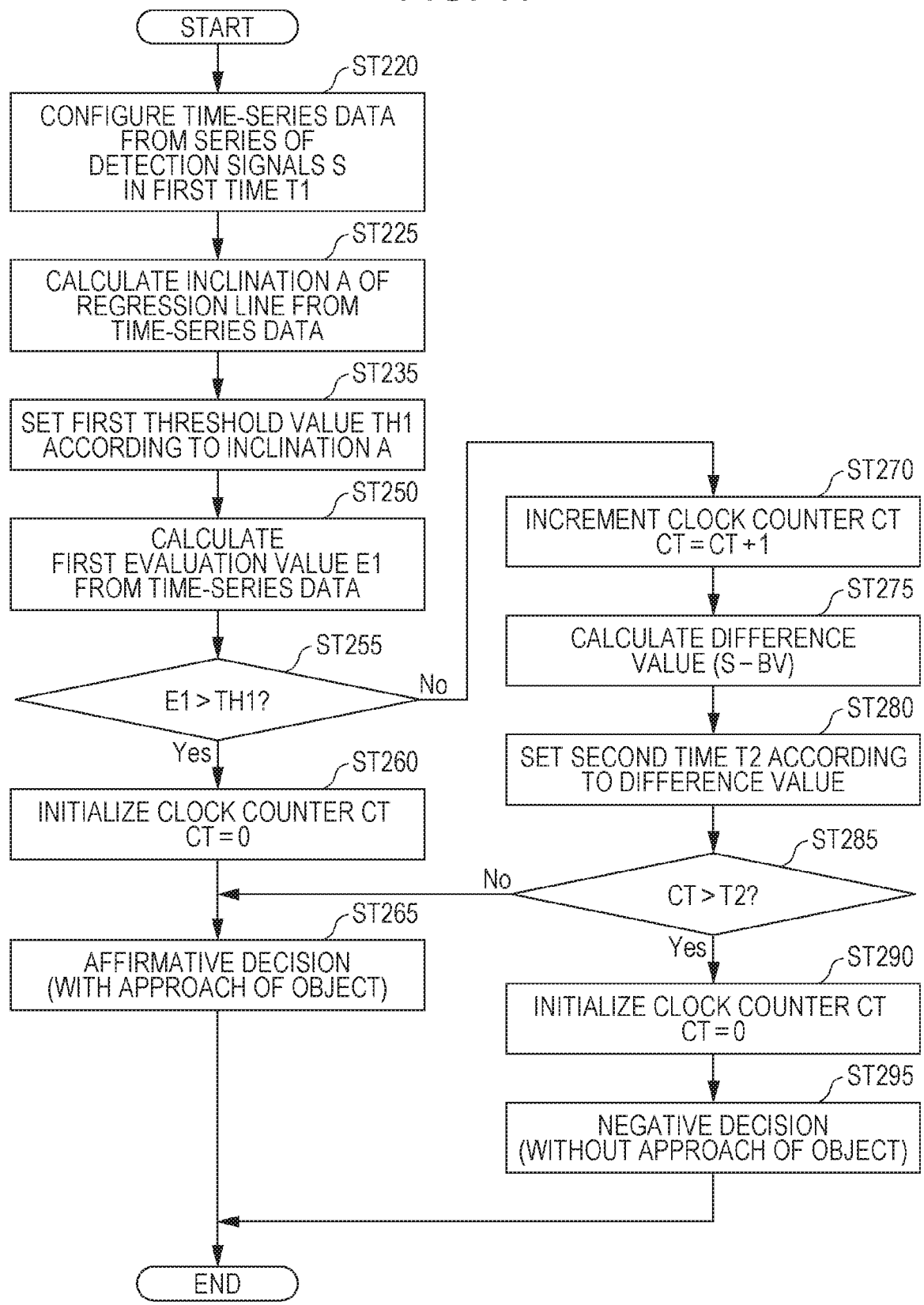
FIG. 11 is a flowchart used to describe an example of decision processing in the deciding unit in the input device according to a third embodiment.

FIG. 11 is a flowchart used to describe an example of decision processing in the deciding unit 302 in the input device according to the third embodiment. In the flowchart indicated in FIG. 11, steps ST230 to ST245 in the flowchart indicated in FIG. 9 are replaced with step ST235. Other steps are the same as in the flowchart indicated in FIG. 9.

In step ST235, the deciding unit 302 sets the first threshold value TH1 according to the inclination A, calculated in step ST225, of the regression line. Specifically, the deciding unit 302 sets first threshold value TH1 so that the lager inclination A of the regression line is, the smaller the first threshold value TH1 is. In this example, a range in which the first evaluation value E1 is smaller than the first threshold value TH1 is the first range described above. The smaller the first threshold value TH1 is, the more likely the first evaluation value E1 is to deviate from the first range. Therefore, the larger the inclination A of the regression line is, the more likely the deciding unit 302 is to decide that a change due to the proximity of the object 1 has occurred in the detection signals S.

In the input device in this embodiment as well, the decision reference in the deciding unit 302 is changed in additional consideration of the linearity of changes in detection signals S, so it is possible to effectively avoid a mistaken decision about the proximity state of the object 1 as in the input device according to the second embodiment.

Figure 12:
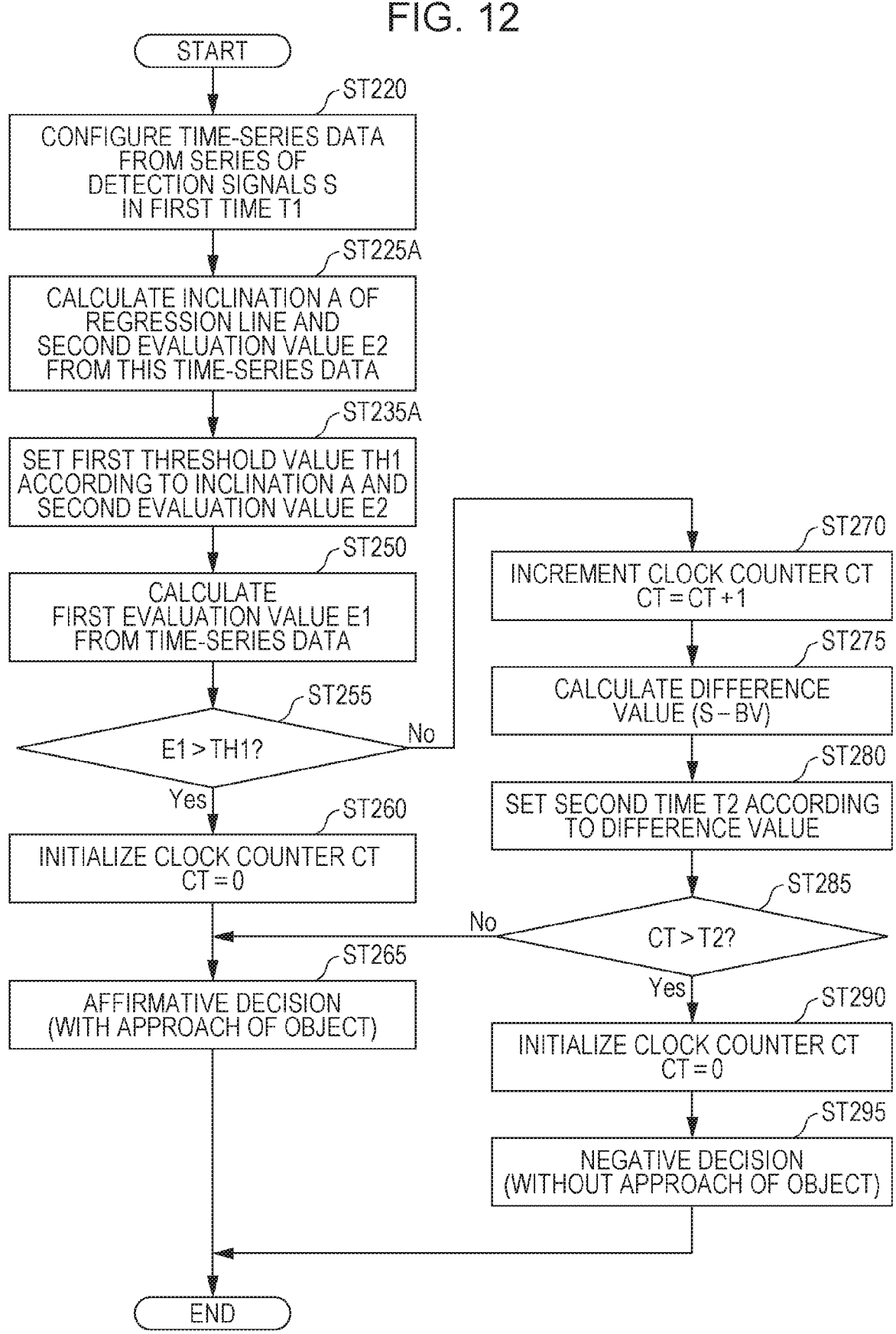
FIG. 12 is a flowchart used to describe an example of a variation of decision processing in the deciding unit in the input device according to the third embodiment.

Next, a variation of the input device according to the third embodiment will be described with reference to the flowchart in FIG. 12. In the flowchart indicated in FIG. 12, steps ST230A to ST245 in the flowchart indicated in FIG. 10 are replaced with step ST235A. Other steps are the same as in the flowchart indicated in FIG. 10.

In step ST235A, the deciding unit 302 sets the first threshold value TH1 according to the second evaluation value E2 and the inclination A, calculated in step ST225A, of the regression line (ST235A). For example, according to a predetermined function that uses the inclination A and second evaluation value E2 as variables, the deciding unit 302 sets the first threshold value TH1 so that the larger the inclination A is, the smaller the first threshold value TH1 is, and that the larger the approximation degree represented by the second evaluation value E2 is, the smaller the first threshold value TH1 is, and that alternatively, the deciding unit 302 may acquire the first threshold value TH1 corresponding to the inclination A and second evaluation value E2 according to a predetermined data table in which correspondence relationships between the inclination A and the first threshold value TH1 and between second evaluation value E2 and the first threshold value TH1 are stipulated. The deciding unit 302 may also select one from two values determined in advance as the value of the first threshold value TH1, according to the results of comparisons between the inclination A and a predetermined threshold value and between the second evaluation value E2 and a predetermined threshold value.

When the linearity of changes in detection signals S is evaluated as described above by using the second evaluation value E2, whether a change due to the proximity of the object 1 has occurred in the detection signals S can be more accurately decided. This makes it possible to avoid an update of the reference value BV in a state in which the object 1 is approaching.

Fourth Embodiment

Next, an input device according to a fourth embodiment will be described. In the input device according to the fourth embodiment, decision processing in the deciding unit 302 in the input device according to the first embodiment described above is partially modified. Other points in the structure are the same as in the input device according to the first embodiment. In the description below, differences from the input device according to the first embodiment will be mainly described.

The deciding unit 302 in the input device according to this embodiment changes not only the second time T2 but also the first time T1 according to the degree of the proximity of the object 1, the degree being indicated by the difference value (S−BV) between the reference value BV and the value of the detection signal S. That is, to make it likely that the decision is made that a change due to the proximity of the object 1 has occurred in the detection signals S, the deciding unit 302 changes the first time T1 so that the higher the degree of the proximity of the object 1, the degree being indicated by the difference value (S−BV) between the reference value BV and the value of the detection signal S, is, the larger the value of the first time T1 is.

Figure 13:
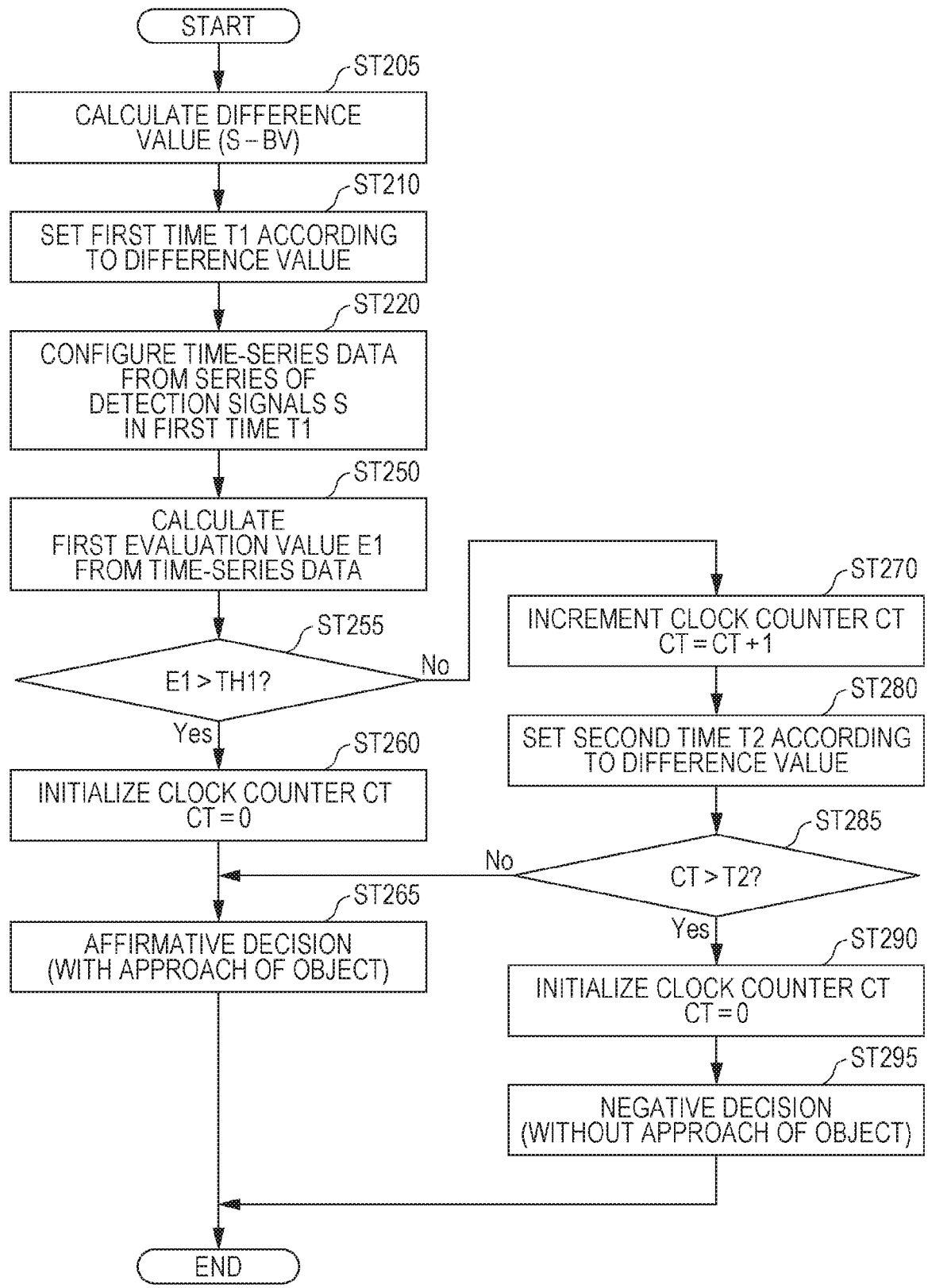
FIG. 13 is a flowchart used to describe an example of decision processing in the deciding unit in the input device according to a fourth embodiment.

FIG. 13 is a flowchart used to describe an example of decision processing in the deciding unit 302 in the input device according to the fourth embodiment. In the flowchart indicated in FIG. 13, steps ST205 and ST210 are added before step ST220 in the flowchart indicated in FIG. 5 and step ST275 in the flowchart indicated in FIG. 5 is omitted. Other steps are the same as in the flowchart indicated in FIG. 5.

The deciding unit 302 calculates the difference between the current reference value BV and the value of the detection signal S acquired in step ST100 as the difference value (S−BV) (ST205), and sets the first time T1 according to this difference value (S−BV) (ST210). For example, the deciding unit 302 sets the first time T1 according to a predetermined function (such as a linear function) that uses the difference value (S−BV) as a variable so that the larger the difference value (S−BV) is, the larger the value of the first time T1 is. Alternatively, the deciding unit 302 may acquire the first time T1 corresponding to the calculated difference value (S−BV), according to a predetermined data table in which a correspondence relationship between the difference value (S−BV) and the first time T1 is stipulated. The deciding unit 302 may also select one from two values determined in advance as the value of the first time T1, according to the result of a comparison between the difference value (S−BV) and a predetermined threshold value.

The deciding unit 302 configures time-series data of detection signals S according to the first time T1 set in step ST210 (ST220). Processing in step ST250 and later is substantially the same as in the flowchart indicated in FIG. 5. However, the difference value (S−BV) calculated in step ST205 is used in the setting of the second time T2 in step ST280.

With the input device according to this embodiment, not only the second time T2 but also the first time T1 are changed according to the difference value (S−BV). Therefore, it becomes easy to flexibly set a decision reference as to whether a change due to the proximity of the object 1 has occurred in the detection signals S, so precision in decision can be improved.

Fifth Embodiment

Next, an input device according to a fifth embodiment will be described. In the input device according to the fifth embodiment, decision processing in the deciding unit 302 in the input device according to the first embodiment described above is partially modified. Other points in the structure are the same as in the input device according to the first embodiment. In the description below, differences from the input device according to the first embodiment will be mainly described.

The deciding unit 302 in the input device according to this embodiment changes not only the second time T2 but also the first threshold value TH1 (first range) according to the degree of the proximity of the object 1, the degree being indicated by the difference value (S−BV) between the reference value BV and the value of the detection signal S. That is, to make it likely that the decision is made that a change due to the proximity of the object 1 has occurred in the detection signals S, the deciding unit 302 changes the first threshold value TH1 so that the higher the degree of the proximity of the object 1, the degree being indicated by the difference value (S−BV) between the reference value BV and the value of the detection signal S, is, the smaller the value of the first threshold value TH1 is.

Figure 14:
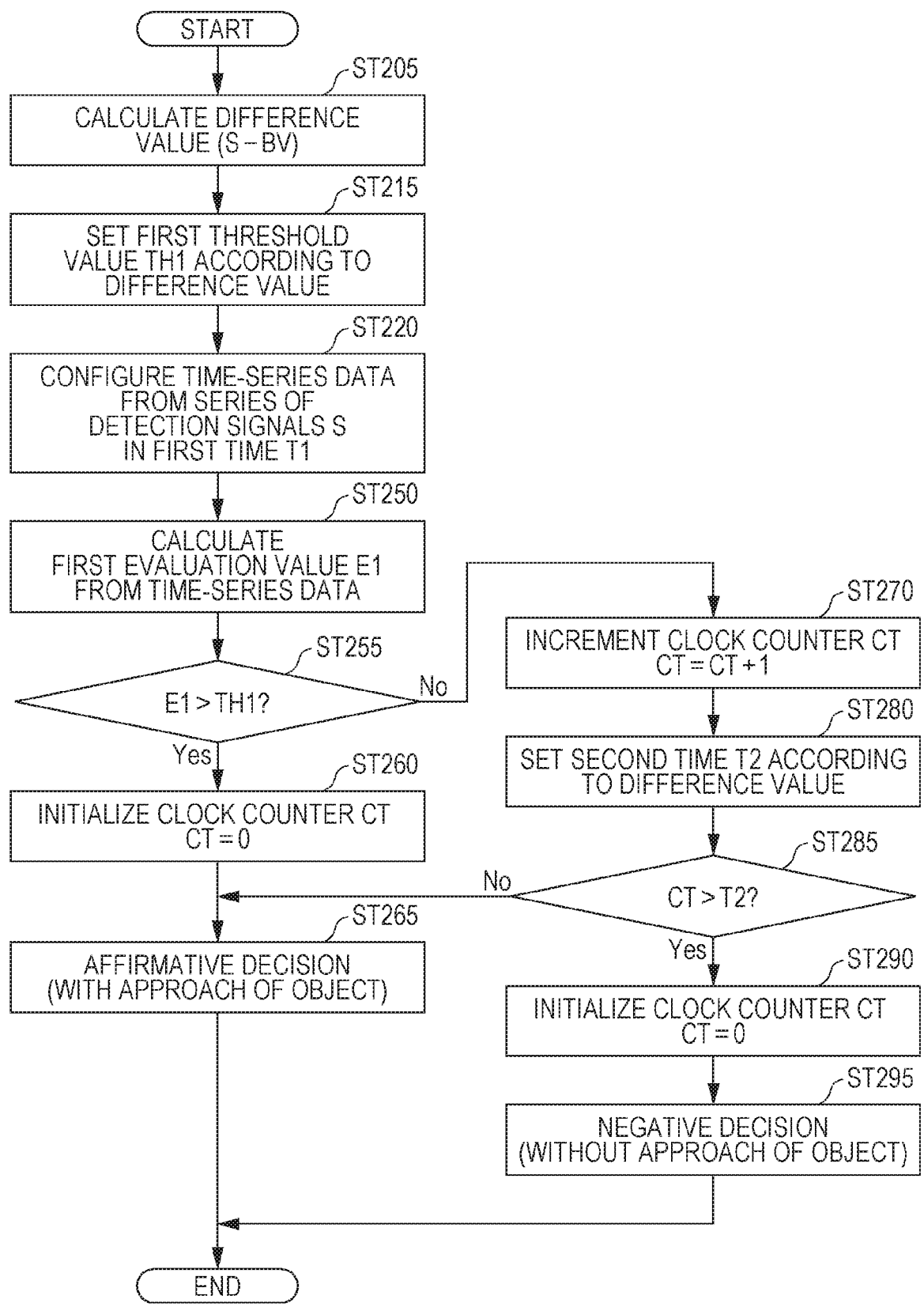
FIG. 14 is a flowchart used to describe an example of decision processing in the deciding unit in the input device according to a fifth embodiment.

FIG. 14 is a flowchart used to describe an example of decision processing in the deciding unit 302 in the input device according to the fifth embodiment. In the flowchart indicated in FIG. 14, steps ST205 and ST215 are added before step ST220 in the flowchart indicated in FIG. 5 and step ST275 in the flowchart indicated in FIG. 5 is omitted. Other steps are the same as in the flowchart indicated in FIG. 5.

The deciding unit 302 calculates the difference between the current reference value BV and the value of the detection signal S acquired in step ST100 as the difference value (S−BV) (ST205), and sets the first threshold value TH1 according to this difference value (S−BV) (ST215). For example, deciding unit 302 sets the first threshold value TH1 according to a predetermined function (such as a linear function) that uses the difference value (S−BV) as a variable so that the larger the difference value (S−BV) is, the smaller the first threshold value TH1 is. Alternatively, the deciding unit 302 may acquire the first threshold value TH1 corresponding to the calculated difference value (S−BV), according to a predetermined data table in which a correspondence relationship between the difference value (S−BV) and the first threshold value TH1 is stipulated. The deciding unit 302 may also select one from two values determined in advance as the first threshold value TH1, according to the result of a comparison between the difference value (S−BV) and a predetermined threshold value.

Processing in step ST220, in which time-series data of detection signals S is configured, and later steps is substantially the same as in the flowchart indicated in FIG. 5. However, the difference value (S−BV) calculated in step ST205 is used in the setting of the second time T2 in step ST280.

With the input device according to this embodiment, not only the second time T2 but also the first threshold value TH1 are changed according to the difference value (S−BV). Therefore, it becomes easy to flexibly set a decision reference as to whether a change due to the proximity of the object 1 has occurred in the detection signals S, so precision in decision can be improved.

Sixth Embodiment

Next, an input device according to a sixth embodiment will be described. In the input device according to the sixth embodiment, decision processing in the deciding unit 302 in the input device according to the fourth embodiment described above is partially modified. Other points in the structure are the same as in the input device according to the fourth embodiment. In the description below, differences from the input device according to the fourth embodiment will be mainly described.

The deciding unit 302 in the input device according to this embodiment repeats processing in which the deciding unit 302 calculates the first evaluation value E1, which indicates the magnitude of a change in the detection signals S in the first time T1, and decides whether this first evaluation value E1 is included in the first range. If the first evaluation value E1 is included in the first range, the deciding unit 302 decides that a change due to the proximity of the object 1 has not occurred in the detection signals S.

When the duration of the stable state in which the first evaluation value E1 is included in the first range exceeds the second time T2, the deciding unit 302 in the input devices according to the first to fifth embodiments has decided that a change due to the proximity of the object 1 has not occurred in the detection signals S. In contrast to this, when the first evaluation value E1 is included in the first range, the deciding unit 302 according to this embodiment decides that a change due to the proximity of the object 1 has not occurred in the detection signals S. Therefore, the deciding unit 302 according to this embodiment sets the first time T1 to a moderately long time so that an appropriate decision result can be obtained from only a single decision about the first evaluation value E1.

Also, the deciding unit 302 according to this embodiment changes the first time T1 according to the degree of the proximity of the object 1, the degree being indicated by the difference value (S−BV) between the reference value BV and the value of the detection signal S. That is, to make it likely that the decision is made that a change due to the proximity of the object 1 has occurred in the detection signals S, the deciding unit 302 changes the first time T1 so that the higher the degree of the proximity of the object 1, the degree being indicated by the difference value (S−BV) between the reference value BV and the value of the detection signal S, is, the larger the value of the first time T1 is.

Figure 15:
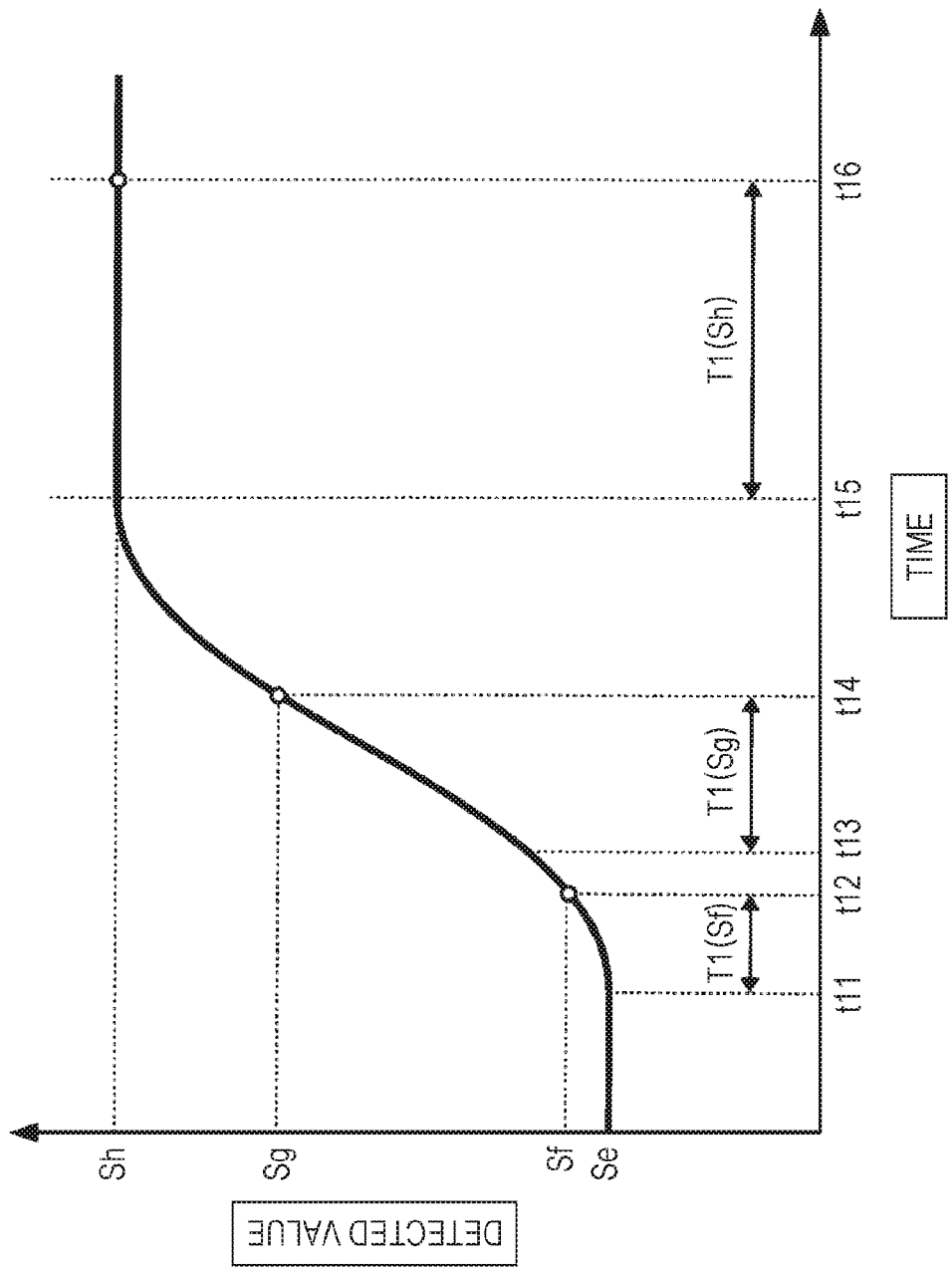
FIG. 15 illustrates a relationship between the first time and the magnitude of the detection signal.

FIG. 15 illustrates a relationship between the first time T1 and the magnitude of the detection signal S. In the example in FIG. 15, the value (detected value) of the detection signal S raises from time t11 to time t16. Specifically, a detected value Sg at t14 is larger than a detected value Sf at t12, and a detected value Sh at t16 is larger than the detected value Sg at t14. Since the value of the first time T1 is set so that the larger the difference between the reference value BV and the value of the detection signal S is (that is, the larger the detected value is), the larger the value of the first time T1 is, the first time T1(Sg) set at time t14 is larger than the first time T1(Sf) set at time t12, and the first time T1(Sh) set at time t16 is larger than the first time T1(Sg) set at time t14.

In the example in FIG. 15: the first evaluation value E1 calculated at time t12 represents a change in the detection signal S in the first time T1(sf) from time t11 to time t12; the first evaluation value E1 calculated at time t14 represents a change in the detection signal S in the first time T1(sg) from time t13 to time t14; and the first evaluation value E1 calculated at time t16 represents a change in the detection signal S in the first time T1(sh) from time t15 to time t16. The first time T1 is set so that it is long to the extent that whether a change due to the proximity of the object 1 has occurred in the detection signals S can be decided by using a single first evaluation value E1.

Figure 16:
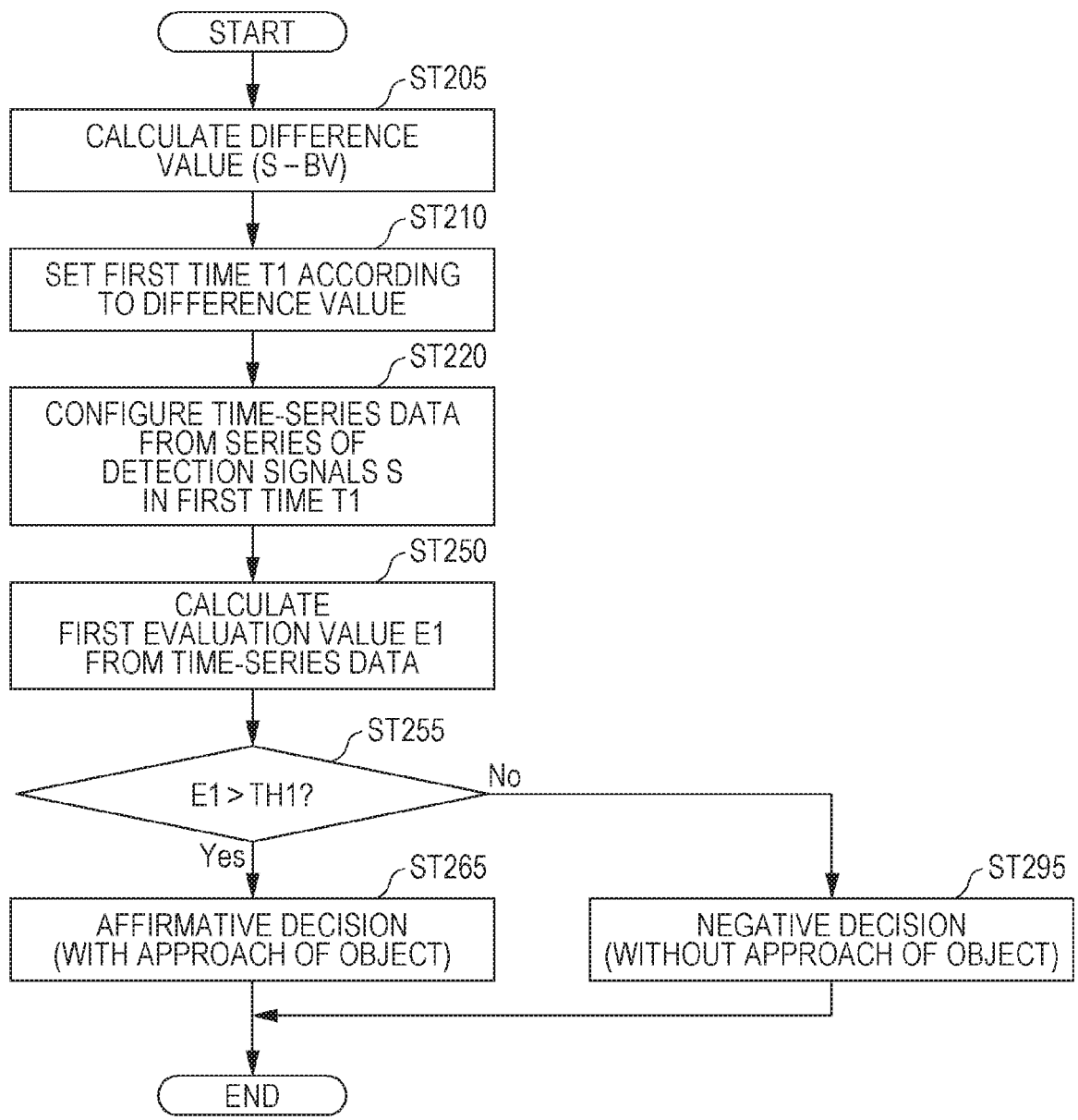
FIG. 16 is a flowchart used to describe an example of decision processing in the deciding unit in the input device according to a sixth embodiment.

FIG. 16 is a flowchart used to describe an example of decision processing in the deciding unit 302 in the input device according to the sixth embodiment. In the flowchart indicated in FIG. 16, steps ST260 and ST270 to ST290 in the flowchart (fourth embodiment) indicated in FIG. 13 are omitted. Other steps are the same as in the flowchart indicated in FIG. 13.

The deciding unit 302 compares the first evaluation value E1 calculated in step ST250 with the first threshold value TH1 (ST255). If the first evaluation value E1 exceeds the first threshold value TH1 (Yes in ST255), the deciding unit 302 decides that a change due to the proximity of the object 1 has occurred in the detection signals S (ST265). If the first evaluation value E1 does not exceed the first threshold value TH1 (No in ST255), the deciding unit 302 decides that a change due to the proximity of the object 1 has not occurred in the detection signals S (ST295).

As described above, with the input device according to this embodiment, the first time T1 is set so that the higher the degree of the proximity of the object 1, the degree being indicated by the difference value (S−BV) between the reference value BV and the value of the detection signal S, is, the longer the first time T1 is. Due to this, if the probability is high that the object 1 is approaching, it becomes likely that the decision is made that a change due to the proximity of the object 1 has occurred in the detection signals S and thereby the reference value BV becomes less likely to be updated, making it possible to effectively avoid a mistaken decision about the proximity state of the object 1 due to an inappropriate change of the reference value By.

Seventh Embodiment

Next, an input device according to a seventh embodiment will be described. In the input device according to the seventh embodiment, decision processing in the deciding unit 302 in the input device according to the fifth embodiment described above is partially modified. Other points in the structure are the same as in the input device according to the fifth embodiment. In the description below, differences from the input device according to the fifth embodiment will be mainly described.

The deciding unit 302 in the input device according to this embodiment repeats processing in which the deciding unit 302 calculates the first evaluation value E1, which indicates the magnitude of a change in the detection signals S in the first time T1, and decides whether this first evaluation value E1 is included in the first range. If the first evaluation value E1 is included in the first range, the deciding unit 302 decides that a change due to the proximity of the object 1 has not occurred in the detection signals S, as in the sixth embodiment described above. Therefore, the deciding unit 302 according to this embodiment also sets the first time T1 to an adequately long time so that an appropriate decision result can be obtained from only a single decision about the first evaluation value E1.

Also, the deciding unit 302 according to this embodiment changes the first threshold value TH1 (first range) according to the degree of the proximity of the object 1, the degree being indicated by the difference value (S−BV) between the reference value BV and the value of the detection signal S. That is, to make it likely that the decision is made that a change due to the proximity of the object 1 has occurred in the detection signals S, the deciding unit 302 makes the first evaluation value E1 likely to deviate from the first range by changing the first threshold value TH1 so that the higher the degree of the proximity of the object 1, the degree being indicated by the difference value (S−BV) between the reference value BV and the value of the detection signal S, is, the smaller the first threshold value TH1 is.

Figure 17:
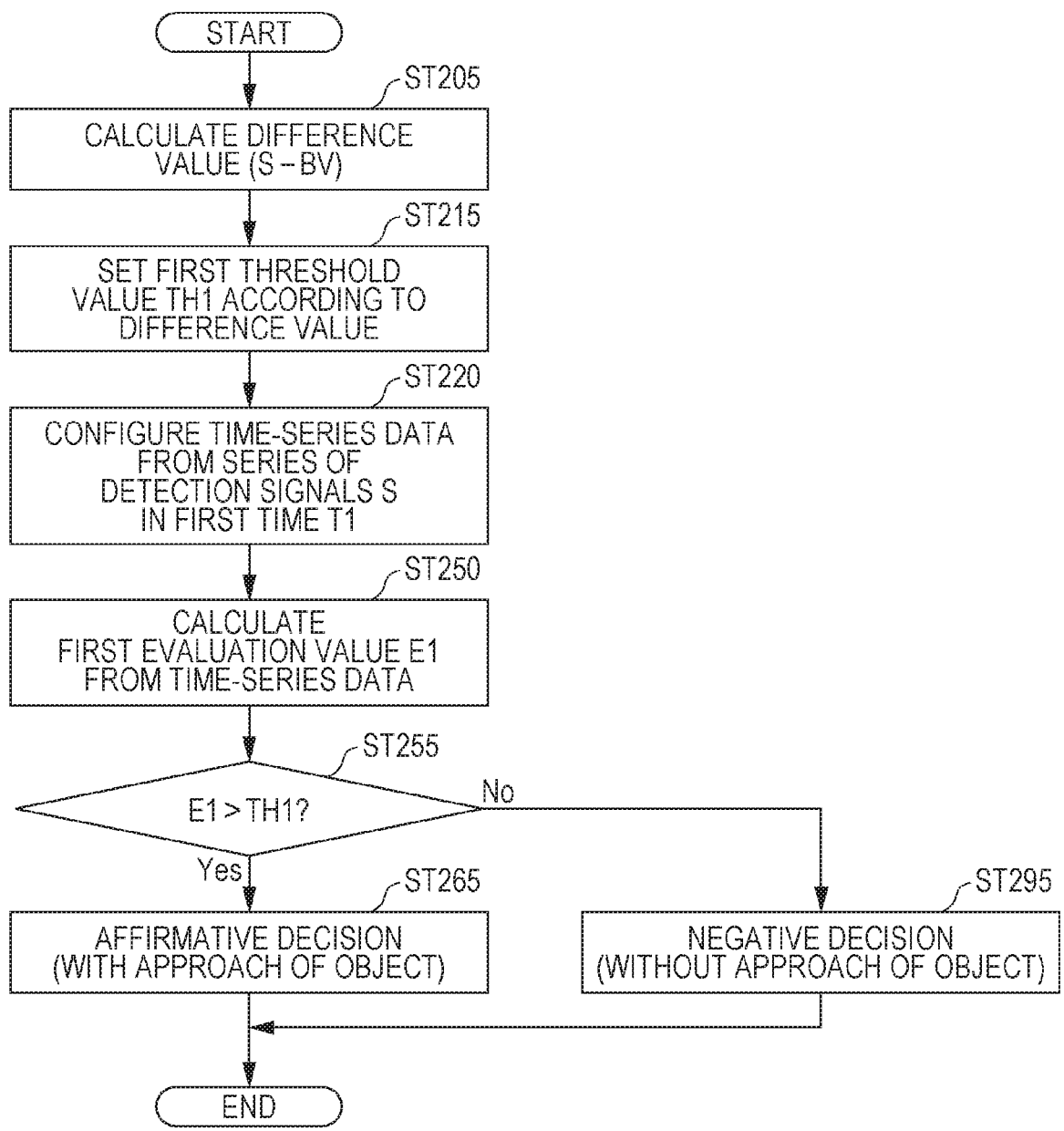
FIG. 17 is a flowchart used to describe an example of decision processing in the deciding unit in the input device according to a seventh embodiment.

FIG. 17 is a flowchart used to describe an example of decision processing in the deciding unit 302 in the input device according to the seventh embodiment. In the flowchart indicated in FIG. 17, steps ST260 and ST270 to ST290 in the flowchart (fifth embodiment) indicated in FIG. 14 are omitted. Other steps are the same as in the flowchart indicated in FIG. 14. Processing in steps ST250 to ST295 is the same as in the flowchart indicated in FIG. 16, so descriptions will be omitted.

As described above, with the input device according to this embodiment, the first threshold value TH1 is set so that the higher the degree of the proximity of the object 1, the degree being indicated by the difference value (S−BV) between the reference value BV and the value of the detection signal S, is, the smaller the first threshold value TH1 is (the first range becomes smaller). Thus, if the probability is high that the object 1 is approaching, it becomes likely that the decision is made that a change due to the proximity of the object 1 has occurred in the detection signals S and thereby the reference value BV becomes less likely to be updated, making it possible to effectively avoid a mistaken decision about the proximity state of the object 1 due to an inappropriate change of the reference value BV.

The present invention is not limited only to the embodiments described above but includes various variations.

Although, for example, the capacitance (also referred to as the self-capacitance), caused between the detection electrode 101 and the object 1, of the capacitor Cx is detected in the detecting units 10 and 10A illustrated in the examples described above, the present invention is not limited to these examples. In other embodiments of the present invention, a detecting unit may detect the capacitance (also referred to as the mutual capacitance) of a capacitor formed between two electrodes (specifically, a driving electrode and a detection electrode). Also, the method of detecting the degree of the proximity of an object in the detecting unit is not limited to the capacitance method but may be another method such as a resistance method or electromagnetic induction method.

Part of the structure in each embodiment described above (for example, part of decision processing in the deciding unit 302) may be added to the structure of another embodiment or may be replaced with part of the structure in another embodiment.

In one aspect of the present disclosure, an input device is provided that enters information matching the proximity state of an object. This input device has: a detecting unit that generates a detection signal that changes according to the degree of the proximity of the object; a deciding unit that decides, according to a series of detection signals generated in the detecting unit, whether a change due to the proximity of the object has occurred in the detection signals; and a reference value updating unit that, if the deciding unit decides that a change due to the proximity of the object has not occurred in the detection signals, updates a reference value indicating the value of the detection signal in a state in which the object is not approaching, according to the detection signals generated in the detecting unit. The deciding unit changes a decision reference so that the higher the degree of the proximity of the object, the degree being indicated by the difference between the reference value and the value of the detection signal, is, the more likely the deciding unit is to decide that a change due to the proximity of the object has occurred in the detection signals.

With the input device described above, it is decided, according to a series of detection signals that change according to the degree of the proximity of an object, whether a change due to the proximity of the object has occurred in the detection signals. If it is decided that a change due to the proximity of the object has not occurred in the detection signals, a reference value is updated that indicates the value of the detection signal in a state in which the object is not approaching. A decision reference is updated so that the higher the degree of the proximity of the object, the degree being indicated by the difference between the reference value and the value of the detection signal, is, the more likely the decision is to be made that a change due to the proximity of the object has occurred in the detection signals. When the degree of the proximity of the object, the degree being indicated by the difference between the reference value and the value of the detection signal, is high, the probability is high that this difference is due to the proximity of the object. Therefore, when the probability that the object is approaching is high due to the change of the above decision reference, it becomes likely that the decision is made that a change due to the proximity of the object has occurred in the detection signals. As a result, in a state in which the object is approaching, the reference value becomes less likely to be updated.

Preferably, the deciding unit may repeatedly decide whether a first evaluation value representing the magnitude of a change in detection signals in a first time is included in a first range; if a state in which the first evaluation value is included in the first range continues for a second time or more, may decide that a change due to the proximity of the object has not occurred in the detection signals; and may change at least one of the first time, first range, and second time according to the degree of the proximity of the object, the degree being indicated by the difference between the reference value and the value of the detection signal.

With this structure, the smaller the first range is, the more likely the first evaluation value is to deviate from the first range and thereby the more likely the decision is to be made that a change due to the proximity of the object has occurred in the detection signals. Also, the longer the first time is, the larger the change in the detection signals in the first time is, so the first evaluation value becomes likely to deviate from the first range and thereby it becomes likely that the decision is made that a change due to the proximity of the object has occurred in the detection signals. Furthermore, the longer the second time is, the more likely the change in the detection signals in the first time is to deviate from the first range and thereby the more likely the decision is to be made that a change due to the proximity of the object has occurred in the detection signals. Therefore, when at least one of the first time, first range, and second time is changed according to the degree of the proximity of the object, the degree being indicated by the difference between the reference value and the value of the detection signal, the decision reference in the deciding unit is changed.

Preferably, the deciding unit may repeatedly decide whether a first evaluation value representing the magnitude of a change in detection signals in a first time is included in a first range; if the first evaluation value is included in the first range, may decide that a change due to the proximity of the object has not occurred in the detection signals; and may change at least one of the first time and first range according to the degree of the proximity of the object, the degree being indicated by the difference between the reference value and the value of the detection signal.

With this structure, the smaller the first range is, the more likely the first evaluation value is to deviate from the first range and thereby the more likely the decision is to be made that a change due to the proximity of the object has occurred in the detection signals. Also, the longer the first time is, the larger the change in the detection signals in the first time is, so the first evaluation value becomes likely to deviate from the first range and thereby it becomes likely that the decision is made that a change due to the proximity of the object has occurred in the detection signals. Therefore, when at least one of the first time and first range is changed according to the degree of the proximity of the object, the degree being indicated by the difference between the reference value and the value of the detection signal, the decision reference in the deciding unit is changed.

Preferably, the deciding unit may calculate the first evaluation value that indicates the magnitude of non-uniformity in detection signals with respect to the average of the detection signals in the first time. For example, the deciding unit may calculate the first evaluation value matching the dispersion or standard deviation of the detection signals in the first time.

Preferably the deciding unit may calculate the first evaluation value matching the difference between a maximum value and a minimum value of the detection signals in the first time.

Preferably, the deciding unit may perform low-pass filter processing to smooth detection signals, and may calculate the first evaluation value that represents the magnitude of the change in the detection signals in the first time, the detection signals having been smoothed in low-pass filter processing.

With this structure, a change in detection signals at high frequencies irrelevant to a change as a result of the proximity of an object is less likely to affect the first evaluation value, so precision in deciding whether a change due to the proximity of the object has occurred in the detection signals is increased.

Preferably, the deciding unit may calculate the inclination of a regression line that approximates a change in the detection signals in the first time, and changes at least one of the first time and first range so that the larger the inclination of the regression line is, the more likely the deciding unit is to decide that a change due to the proximity of the object has occurred in the detection signals.

With this structure, the larger the calculated inclination of the regression line is, the more linear the change in the detection signals in the first time is, so the probability is high that the change is as a result of the proximity of the object. Therefore, when at least one of the first time and first range is changed so that the larger the inclination of the regression line is, the more likely the decision is to be made that a change due to the proximity of the object has occurred in the detection signals, it becomes easy to restrain the reference value from being updated in a state in which the object is approaching.

Preferably, the deciding unit may calculate a second evaluation value that represents the degree of approximation between the detection signal and an inferred value of the detection signal, the inferred value being based on the regression line, and may change at least one of the first time and first range so that the higher the degree of the approximation, the degree being represented by the second evaluation value, is, the more likely the deciding unit is to decide that a change due to the proximity of the object has occurred in the detection signals.

With this structure, the larger the calculated inclination of the regression line is and the higher the degree, represented by the second evaluation value, of approximation is, the more linear the change in the detection signals in the first time is, so the probability is further high that the change is as a result of the proximity of the object. Therefore, when at least one of the first time and first range is changed so that the higher the degree, represented by the second evaluation value, of approximation is, the more likely the decision is to be made that a change due to the proximity of the object has occurred in the detection signals, it becomes easy to further restrain the reference value from being updated in a state in which the object is approaching.

Preferably, the detecting unit may include at least one electrode that forms a capacitor, the capacitance of which being changed depending on the degree of the proximity of the object, and may also include a capacitance detection circuit that generates the detection signal matching the capacitance according to charge in the capacitor, the charge being transferred through the electrode.

According to another one aspect of the present disclosure, a method of controlling an input device that enters information matching the proximity state of an object. The input device has a detecting unit that generates a detection signal that changes according to the degree of the proximity of the object. The control method includes: deciding, according to a series of detection signals generated in the detecting unit, whether a change due to the proximity of the object has occurred in the detection signals; updating, if the decision is made that a change due to the proximity of the object has not occurred in the detection signals, a reference value indicating the value of the detection signal in a state in which the object is not approaching, according to the detection signals generated in the detecting unit; and changing a decision reference so that the higher the degree of the proximity of the object, the degree being indicated by the difference between the reference value and the value of the detection signal, is, the more likely the decision is to be made that a change due to the proximity of the object has occurred in the detection signals.

Preferably, the deciding whether a change due to the proximity of the object has occurred in the detection signals may include: repeatedly deciding whether the magnitude of the change in the detection signals in a first time is included in a first range; and deciding, if a state in which the magnitude of the change in the detection signals in the first time is included in the first range continues for a second time or more, that a change due to the proximity of the object has not occurred in the detection signals. The changing the decision reference may include changing at least one of the first time, first range, and second time according to the degree of the proximity of the object, the degree being indicated by the difference between the reference value and the value of the detection signal.

Preferably, the deciding whether a change due to the proximity of the object has occurred in the detection signals may include: repeatedly deciding whether the magnitude of the change in the detection signals in a first time is included in a first range; and deciding, if the magnitude of the change in the detection signals in the first time is included in the first range, that a change due to the proximity of the object has not occurred in the detection signals. The changing the decision reference may include changing at least one of the first time and first range according to the degree of the proximity of the object, the degree being indicated by the difference between the reference value and the value of the detection signal.

According to another one aspect of the present disclosure, a program is provided that causes a computer to execute the method of controlling the input device, the method having been described above.

So far, the input device, the method of controlling the input device, and the program have been described according to the embodiments of the present invention. However, the present invention is not limited to the embodiments described above, but various variations are possible without departing from the scope of the present invention.

What is claimed is:

1. An input device that enters information according to a proximity state of an object approaching thereto, the input device comprising:
   a detecting unit configured to generate a detection signal that changes according to a degree of proximity of the approaching object;
   a deciding unit configured to decide whether a change in the detection signal due to the proximity of the approaching object has occurred based on a series of detection values of the detection signal, according to decision criteria; and
   a reference value updating unit configured to update a reference value for the detection signal, if the deciding unit makes a decision that a change in the detection signal due to the proximity of the approaching object has not occurred, the reference value indicating a value of the detection signal in a state in which no object is approaching, according to the series of detection values generated in the detecting unit,
   wherein the deciding unit is further configured to change at least one of the decision criteria, such that the greater a difference between the reference value and the detection value of the detection signal is, the more likely the deciding unit is to make a decision that the change in the detection signal due to the proximity of the approaching object has occurred, the difference between the reference value and the detection value of the signal indicating the degree of proximity of the approaching object, whereby the higher the degree of the proximity of the approaching object is, the less likely the reference value is updated.

2. The input device according to claim 1, wherein the deciding unit is further configured to:
repeatedly decide whether a first evaluation value representing a magnitude of a change in the detection signal in a first time period is within a first range;
if a state in which the first evaluation value is within the first range continues for a second time period or longer, decide that a change due to the proximity of the object has not occurred in the detection signal; and
change at least one of the first time period, the first range, and the second time period, according to the degree of the proximity of the object, the degree being indicated by the difference between the reference value and the detection value of the detection signal.

3. The input device according to claim 2, wherein the deciding unit is configured to calculate the first evaluation value that indicates a magnitude of non-uniformity in the detection signal in the first time period based on an average of the detection values during the first time period.

4. The input device according to claim 3, wherein the deciding unit is configured to calculate the first evaluation value corresponding to a dispersion or standard deviation of the detection values in the first time period.

5. The input device according to claim 2, wherein the deciding unit is configured to calculate the first evaluation value corresponding to a difference between a maximum value and a minimum value of the detection values in the first time period.

6. The input device according to claim 2, wherein the deciding unit is configured to perform low-pass filter processing to smooth the detection values, and to calculate the first evaluation value that represents the magnitude of the change in the detection signal in the first time period, for which the detection values having been smoothed in the low-pass filter processing.

7. The input device according to claim 2, wherein the deciding unit is configured to calculate an inclination of a regression line that approximates the change in the detection signal in the first time period, and to change at least one of the first time period and the first range, so that the larger the inclination of the regression line is, the more likely the deciding unit is to decide that a change due to the proximity of the object has occurred in the detection signal.

8. The input device according to claim 7, wherein the deciding unit is configured to calculate a second evaluation value that represents a degree of approximation between the detection value of the detection signal and an inferred value of the detection signal, the inferred value being based on the regression line, and to change at least one of the first time and the first range so that the higher the degree of the approximation, the degree being represented by the second evaluation value, is, the more likely the deciding unit is to decide that a change due to the proximity of the object has occurred in the detection signal.

9. The input device according to claim 1, wherein the deciding unit is further configured to:
repeatedly decide whether a first evaluation value representing a magnitude of a change in the detection signals in a first time period is within in a first range;
if the first evaluation value is within in the first range, decide that a change due to the proximity of the object has not occurred in the detection signal; and
change at least one of the first time period and the first range according to the degree of the proximity of the object, the degree being indicated by the difference between the reference value and the detection value of the detection signal.

10. The input device according to claim 1, wherein the detecting unit includes:
at least one electrode configured to form a capacitor, a capacitance of which changes depending on the degree of the proximity of the object; and
a capacitance detection circuit configured to generate the detection signal corresponding to charge received from the capacitor via the electrode.

11. A method of controlling an input device that enters information according to a proximity state of an object approaching the input device, the input device including a detecting unit, the method comprising:
generating, in the detecting unit, a detection signal that changes according to a degree of proximity of the approaching object;
deciding whether a change due to the proximity of the approaching object has occurred in the detection signal based on a series of detection values of the detection signal, according to decision criteria;
updating, if a decision is made that a change due to the proximity of the approaching object has not occurred in the detection signals, a reference value for the detection signal, the reference value indicating a value of the detection signal in a state in which no object is approaching, according to the series of detection values generated in the detecting unit; and
changing at least one of the decision criteria such that the greater a difference between the reference value and the detection value of the detection signal is, the more likely a decision is to be made that a change due to the proximity of the approaching object has occurred in the detection signal, the difference between the reference value and the detection value of the detection signal indicating the degree of proximity of the approaching object, whereby the higher the degree of the proximity of the approaching object is, the less likely the reference value is updated.

12. The method of controlling the input device according to claim 11,
wherein the deciding includes:
repeatedly deciding whether a magnitude of a change in the detection signal in a first time period is within a first range, and
deciding, if a state in which the magnitude of the change in the detection signals in the first time period is within the first range continues for a second time period or longer, that a change due to the proximity of the object has not occurred in the detection signals; and
wherein the changing includes:
changing at least one of the first time period, the first range, and the second time period according to the degree of the proximity of the object, the degree being indicated by the difference between the reference value and the detection value of the detection signal.

13. The method of controlling the input device according to claim 11,
wherein the deciding includes:
repeatedly deciding whether a magnitude of a change in the detection signal in a first time period is within a first range, and deciding, if the magnitude of the change in the detection signals in the first time period is within the first range, that a change due to the proximity of the object has not occurred in the detection signals; and wherein the changing the includes:

changing at least one of the first time period and the first range according to the degree of the proximity of the object, the degree being indicated by the difference between the reference value and the detection value of the detection signal.

14. A non-transitory computer-readable medium with an executable program stored therein, for causing a computer to execute the method of controlling the input device according to claim 11.

* * * * *